(12) United States Patent
Garrett et al.

(10) Patent No.: US 9,806,486 B2
(45) Date of Patent: Oct. 31, 2017

(54) OPTICAL AMPLIFIER MODULE

(71) Applicant: II-VI Incorporated, Saxonburg, PA (US)

(72) Inventors: Mark H. Garrett, Morgan Hill, CA (US); Aravanan Gurusami, Morgan Hill, CA (US); Ian Peter McClean, Brixham (GB); Nadhum Zayer, Devon (GB); Eric Timothy Green, Corning, NY (US); Mark Filipowicz, Scotts Valley, CA (US); Massimo Martinelli, Santa Clara, CA (US)

(73) Assignee: II-VI Incorporated, Saxonburg, PA (US)

( * ) Notice: Subject to any disclaimer, the term of this patent is extended or adjusted under 35 U.S.C. 154(b) by 0 days.

(21) Appl. No.: 15/072,520

(22) Filed: Mar. 17, 2016

(65) Prior Publication Data

US 2016/0276797 A1    Sep. 22, 2016

Related U.S. Application Data

(60) Provisional application No. 62/135,641, filed on Mar. 19, 2015.

(51) Int. Cl.
*H01S 3/067* (2006.01)
*H01S 3/30* (2006.01)
(Continued)

(52) U.S. Cl.
CPC ........ *H01S 3/06704* (2013.01); *G02B 26/023* (2013.01); *H01S 3/0064* (2013.01); *H01S 3/06758* (2013.01); *H01S 3/0941* (2013.01); *H01S 3/094049* (2013.01); *H01S 3/1608* (2013.01); *H01S 3/302* (2013.01); (Continued)

(58) Field of Classification Search
CPC ............. H01S 3/06704; H01S 3/06754; H01S 3/06758
See application file for complete search history.

(56) References Cited

U.S. PATENT DOCUMENTS 6,353,497 B1   3/2002   Zhang et al.
6,384,961 B2   5/2002   Lawrence
(Continued)

OTHER PUBLICATIONS

Cole, Chris, "Next Generation CFP Modules", OFC/NFOEC, Mar. 4-8, 2012, pp. 1-3.

*Primary Examiner* — Eric Bolda
(74) *Attorney, Agent, or Firm* — Wendy W. Koba

(57) ABSTRACT

An optical amplifier module is configured as a multi-stage free-space optics arrangement, including at least an input stage and an output stage. The actual amplification is provided by a separate fiber-based component coupled to the module. A propagating optical input signal and pump light are provided to the input stage, with the amplified optical signal exiting the output stage. The necessary operations performed on the signal within each stage are provided by directing free-space beams through discrete optical components. The utilization of discrete optical components and free-space beams significantly reduces the number of fiber splices and other types of coupling connections required in prior art amplifier modules, allowing for an automated process to create a "pluggable" optical amplifier module of small form factor proportions.

31 Claims, 17 Drawing Sheets

(51) Int. Cl.
*G02B 6/38* (2006.01)
*G02B 6/42* (2006.01)
*G02B 26/02* (2006.01)
*H04B 10/11* (2013.01)
*H01S 3/094* (2006.01)
*H01S 3/0941* (2006.01)
*H01S 3/16* (2006.01)
*H01S 3/00* (2006.01)

(52) U.S. Cl.
CPC ............ *H04B 10/11* (2013.01); *G02B 6/3897* (2013.01); *G02B 6/4256* (2013.01); *H01S 3/0071* (2013.01); *H01S 3/0078* (2013.01); *H01S 3/094003* (2013.01); *H01S 3/094053* (2013.01)

(56) References Cited

U.S. PATENT DOCUMENTS

| | | |
|---|---|---|
| 6,483,978 B1 | 11/2002 | Gao et al. |
| 7,130,121 B2 | 10/2006 | Pan et al. |
| 7,317,570 B2 | 1/2008 | McClean et al. |
| 2001/0021060 A1* | 9/2001 | Kim ................ G02F 2/004 359/332 |
| 2002/0186952 A1 | 12/2002 | Gao et al. |
| 2003/0165007 A1 | 9/2003 | Frolov et al. |
| 2003/0185485 A1* | 10/2003 | Bennett .............. G02B 6/12004 385/14 |
| 2005/0226278 A1* | 10/2005 | Gu ........................ H01S 3/0057 372/6 |
| 2006/0120418 A1* | 6/2006 | Harter .................. H01S 3/1106 372/30 |
| 2007/0248136 A1* | 10/2007 | Leonardo ............. B23K 26/067 372/55 |
| 2009/0190934 A1* | 7/2009 | Zhang ..................... G02B 6/12 398/160 |
| 2009/0257116 A1 | 10/2009 | Sweeney et al. |
| 2009/0290212 A1 | 11/2009 | Jiang et al. |
| 2011/0085231 A1* | 4/2011 | Bolshtyansky ..... H01S 3/06754 359/341.33 |
| 2013/0058646 A1 | 3/2013 | McClean et al. |
| 2014/0056593 A1* | 2/2014 | DeAndrea ........... H04B 10/291 398/135 |

\* cited by examiner

OPTICAL AMPLIFIER MODULE

CROSS-REFERENCE TO RELATED APPLICATIONS

This application claims the benefit of U.S. Provisional Application Ser. No. 62/135,641, filed Mar. 19, 2015 and herein incorporated by reference.

TECHNICAL FIELD

The present invention relates to an optical amplifier module and, more particularly, to a module employing free-space optics to minimize both the size and cost of the module.

BACKGROUND

Various types of optical amplifiers, such as erbium-doped fiber amplifiers (EDFAs) and distributed Raman amplifiers (DRAs), are ubiquitous components of optical communication systems, eliminating the need to perform optical-electrical-optical signal transformations when regeneration of a fading optical signal is required.

In the case of EDFAs, an optical pump laser (typically operating at 980 nm) is coupled into a section of Er-doped optical fiber, and the incoming optical signal is co-propagated through the doped fiber with the pump light. The presence of the pump light with the erbium dopant generates amplification of the propagating optical signal by the transitions of the optically-excited erbium ions. In addition to the pump source and the doped fiber (as well as the optical couplers required to inject the signal and pump light into the fiber), a conventional optical amplifier module includes a filter component (typically a WDM component) that is used to introduce the signal and pump into the fiber. The incoming optical signal also needs to be isolated from back reflections along the input path, necessitating the use of an optical isolator along the input signal path. Isolation is also necessary at the output of the amplifier, to prevent high power optical output signals from being reflected back into erbium-doped fiber itself.

The optical gain may vary spectrally, which may create a non-uniform amplification of the various wavelengths within the amplifying fiber. To improve uniformity in the amount of amplification provided at each different wavelength forming the input signal, a gain-flattening filter may be included, and positioned to receive the amplified output from the doped fiber.

In certain system applications, it may be necessary to monitor the input and output signals associated with the amplifier, thus providing closed-loop control of the amplifier's performance. Another component that may be required is a variable optical attenuator, which is used to introduce post-amplification attenuation for controlling the power delivered by the output signal. A tunable optical filter is another component which may be included in an optical amplifier to reduce the amount of broadband optical noise (amplified spontaneous emission, or ASE), which is generated during amplification along the span of doped fiber from reaching the output of the amplifier. While a distributed Raman amplifier (DRA) does not utilize rare earth doped fiber to create gain, the Raman amplification process still requires the coupling of an additional light beam (pulses) into an optical fiber and utilizes post-amplification techniques to improve the quality of the amplified optical signal.

The various components forming an optical amplifier module are typically made as fiber-coupled elements, and in some cases integrated (or hybridized) to form, for example, a combined isolator and WDM filter, or a combined isolator and GFF filter, or the like. Of course, lower cost and smaller-sized modules lowers the overall system costs. Thus, the trend to smaller components, more hybridization and smaller modules has been taking place for some time. Indeed, the pressure for smaller form factors and lower costs continues to be exerted on the industry.

One path to assuage these demands is to continually reduce the size of the various components and, perhaps, increase their degree of integration. However, this is not easily accomplished in an environment where the cost of the amplifier module is also a concern. Indeed, the size of these components has decreased to the point where they cannot be readily assembled using conventional industry techniques such as, for example, manual packaging (with the assistance of micrometers) by assembly-line personnel. Indeed, as the level of integration increases and the size of the components decreases (e.g., the size of some of these components can be on the order of 1 mm×1 mm×1 mm), it becomes difficult to have a highly repeatable assembly process with high yield. Moreover, in contrast to electronic integrated circuits, modules such as optical amplifiers also require alignment of the optical beams and creation of a large number of optical splices. All of these issues add yet another level of concern (and cost) to the efficiency of production and the integrity of the final product.

Furthermore, even with reduction in size of an optical amplifier module, such as from increasing the level of integration within the hybrid components, the different hybrids must be coupled to each other via fiber splicing and routing. The fiber splices themselves require splice protectors, which further adds to the size of the assembly (and to the labor-intensive assembly of the module). These fibers also need to be routed between the various components, which may involve the use of yet another element to coordinate the placements and paths that these fibers take (a further impairment to reducing the overall size of the module to meet small form factor device requirements). As a consequence of the minimum bend radius of the optical fiber (i.e., the optical signal loss increases with a smaller bend radius; the physical failure of the fiber increases with a smaller bend radius as well) as well as the relatively large number of fiber splices and splice protectors mandating the same, the ability to further hybridize current configurations is quickly reaching its technical limits, size limits and economical possibilities of implementation.

Thus, for an optical amplifier module to continue to meet the expectations of cost and size reduction, while maintaining performance requirements, a different approach to configuring an optical amplifier module is required.

SUMMARY OF THE INVENTION

The needs remaining in the prior art are addressed by the present invention, which relates to an optical amplifier module and, more particularly, to a module employing free-space optics instead of the prior art fiber-based components (including hybrid configurations) to minimize both the size and cost of the module.

In accordance with one embodiment of the present invention, an exemplary optical amplifier module is configured as a multi-stage arrangement, including at least an input stage and an output stage (and in some embodiments a post-amplifier stage, with perhaps an additional signal conditioning stage between the post-amp and output stages). The actual amplification is provided by an external fiber-based component coupled to the module. The incoming optical signal and pump light are provided to the input stage, with the amplified optical signal exiting the output stage. The operations performed on the optical signal within each stage are provided by free-space optics (i.e., free-space beams propagating between discrete optical components). The modular configuration allows for the specific composition of each stage to be changed, as necessary.

In one embodiment of the present invention, a post-amp stage includes a gain-flattening filter to improve the uniformity of amplification applied to different wavelengths within the propagating multi-wavelength optical signal. A signal conditioning stage may include a variable optical attenuator to adjust the power level of the amplified signal, and/or a tunable optical filter to limit the amount of unwanted noise appearing in the amplified output signal.

A particular embodiment of the present invention may be configured as a rare earth-doped optical fiber amplifier, providing pump light of a specific wavelength to propagate along a coil of rare-earth (e.g., erbium) doped optical fiber at the same time as the input optical signal. Another embodiment of the present invention takes the form of a distributed Raman amplifier (DRA), where high-power laser pulses (used as the amplifying light source) are injected into a signal path along which the input optical signal is propagating. Yet another embodiment may be configured as a hybrid EDFA/DRA, while retaining the size and cost benefits of the present invention.

A specific embodiment of the present invention takes the form of an optical amplifier for providing fiber-based amplification of an optical signal propagating along an incoming optical transmission signal path, the optical amplifier comprising a fiber amplifier arrangement and a multi-stage optical amplifier module coupled to the fiber amplifier arrangement. The multi-stage optical amplifier module includes an input stage responsive to an incoming optical signal and an amplifying light input, and an output stage for providing an amplified signal as the optical amplifier output. The multi-stage optical amplifier is disposed within a housing including optical inputs and outputs, as well as electrical inputs and outputs, with each stage supporting the transmission of the incoming optical signal, amplifying light, and an amplified optical signal as free-space beams and including a plurality discrete optical components to interact with the free-space beams and provide the amplified optical output signal.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
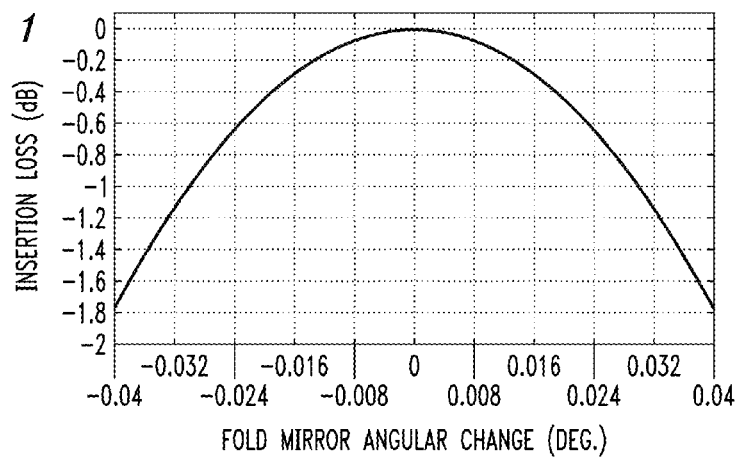
FIG. 1 is a graph of insertion loss as a function of mirror angle.

As mentioned above, the present invention relates to an optical amplifier module that addresses the various size, expense and performance demands that continue to drive the development of optical systems that comport with small form factor requirements. As will be discussed in detail below, the optical amplifier of the present invention takes the form of a compact module where the amount of required fiber is minimized (for example, used only for input/output fiber pigtails and the actual amplifying doped fiber) and the remaining optical components are formed as discrete elements with free-space signaling used between the discrete elements. In one embodiment, a number of appropriately-placed turning mirrors are used to ensure that all of the necessary optical connections terminate along a single sidewall of the module. A significant aspect of the present invention is the "modularity" of the various subsystems (referred to as "stages" throughout the following discussion) included within the module, allowing for different subsystems to be utilized as desired to provide various different features and functionalities.

Moreover, the pairs of turning mirrors function as compensators that allow for the free-space optical signal paths to be properly aligned during assembly by adjusting the angle at which the mirrors are positioned. That is, the use of the pair of (adjustable) turning mirrors allows for beam pointing errors and beam displacement between input and output ports to be eliminated so that the optical coupling is maximized for the free-space optical system.

For example, consider the transmission through an optical isolator. Even with the most precise fabrication methods, the output beam will be transversely offset from the input beam by about 100 microns (more or less). In addition to this transverse offset, there is an inherent amount of angular offset in the output beam that is attributed to fabrication and mechanical assembly limitations. Similar instances of beam pointing and displacement errors can be found along the various free-space paths between the discrete optical components in the amplifier module. Furthermore, the input beam presented to the free-space system will be angularly offset from the nominal optical axis as a result of the relatively imprecise alignment of the input fiber to the collimating lens (as described below).

Thus, the utilization of adjustable turning ("folding") mirrors in accordance with the present invention allows for compensation to be created during assembly. Indeed and as discussed below, the ability to adjust the positioning of the turning mirrors at each stage along the assembly process prevents the accumulation of these beam misalignment problems and, as a result, increases the reliability of the final product.

Indeed, it is uncommon in the prior art to utilize a two-mirror system, since changes in the angular position of a mirror leads to twice the angular change in the beam. Doubling the number of mirrors multiplies these angular changes. The angular changes of the beam can result in a displacement of the focused beam at the output fiber, a coupling that is highly sensitive to displacement.

In the systems described below, where it is required to couple the amplified optical signal into an output fiber, such angular changes of the beam result in a displacement of the focused beam at the output fiber to which the coupling is highly sensitive. For example, increases in coupling loss between the input fiber to free-space optics module and the output fiber from the module to the fiber amplifier translate directly to a decrease in the (NF) noise figure (signal-to-noise of the input (in dB) less the signal-to-noise (in dB) of the output) of the amplifier. It is imperative to keep such losses to a minimum. FIG. 1 is a plot of the insertion loss, as a function of the mirror angle, at an output collimator having a focal length of about 2.4 mm.

Figure 2:
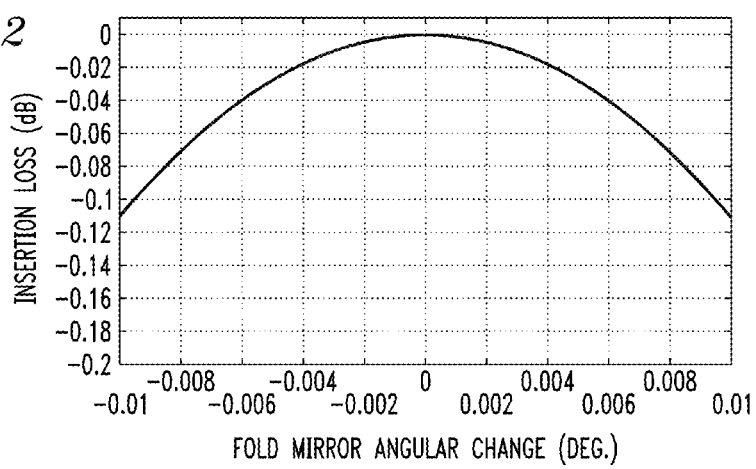
FIG. 2 is a graph of output insertion loss (such as from the input stage of the optical amplifier) as a function of the fold mirror angle.
Figure 3:
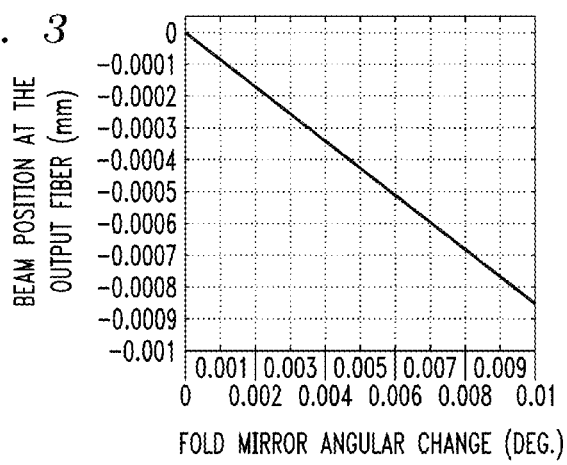
FIG. 3 is a graph of beam position at the output fiber as a function of fold mirror angle.

To minimize the NF for optical amplifiers, the excess loss due to mirror pointing changes needs to be below 0.1 dB. As shown in FIG. 2, this means the mirror needs to be angularly aligned to less than 5 mille degrees and its angular position must be maintained (over life) to continue to pro this absolute loss of 0.1 dB. Such an achievement means that the relative movement of the final output beam from the free-space optics amplifier module that is focused onto the output fiber needs to be less than 1 micron, as shown in FIG. 3. (Beam displacements to the output lens are less sensitive.)

As a result of these aforementioned alignment tolerances and assembly stability requirements during assembly and changes due to post assembly environmental stress, there is a considerable barrier for common alignment methods, material choices, and fixing methods. Nevertheless, due to the recent advancement of assembly tools (typically using piezoelectric actuators) with 10-50 nanometer spatial resolution, and 0.2 mille degree angular resolution the alignment conditions can be met with appropriate optical feedback. Furthermore, given the short optical path of these free-space optics system use of well-known low CTE housing materials can be employed which will produce inconsequential micron level optical path changes. And finally, with the development of low shrinkage epoxies, and relatively low expansions for thin layers of epoxy the optics can be readily fixed and held over the life of the product to the necessary tolerance to make a high degree of functional integration viable for optical amplifiers. With such aforementioned methods a new miniature amplifier is conceived and described herein.

Figure 4:
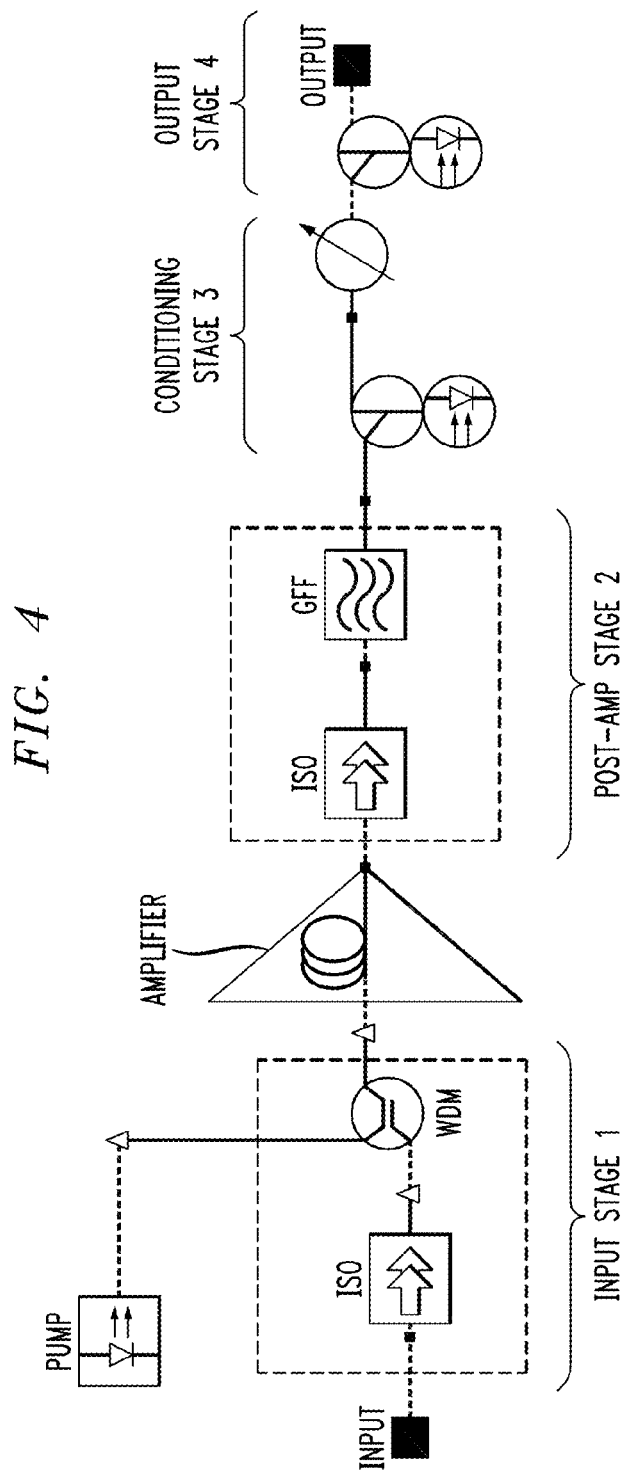
FIG. 4 is a block diagram of various conventional components used to form an optical amplifier.

FIG. 4 is a diagram of various conventional components used to form an optical amplifier, and is shown for the sake of convenience in order to fully understand and appreciate the compact module configurations that may be formed in accordance with the present invention. As shown, this particular optical amplifier is formed of four stages of optical functionality: Stage 1 (input stage)—coupling together an input optical signal and pump light (where in this example the input optical signal is to be amplified within a rare-earth doped fiber by virtue of the presence of the pump light); Stage 2 (post-amplifier stage)—performing "gain flattening" on the amplified input signal (such that each separate optical wavelength is amplified by essentially the same amount); Stage 3 (conditioning stage)—signal conditioning, which may include one or more different elements to perform various types of operations, such as adjusting the output power of the amplified signal to an appropriate level (using a MEMS-based variable optical attenuator (VOA), as described below), and/or a tunable optical filter (TOF) to ensure that the amplified output signal is bandwidth-limited to the wavelength of the input optical signal (this stage may be optional); and Stage 4 (output stage)—providing the "final" form of the amplified optical signal as the output signal from the optical amplifier module path. The output stage may include an optical tap and a photodiode that is used, for example, to monitor the overall performance of the amplifier (in terms of output power of optical signal).

The actual amplification for this arrangement takes place between Stages 1 and 2, as indicated by the diagram in FIG. 4. Additionally, while this particular doped fiber amplifier configuration will be described below as being an erbium-doped fiber amplifier (EDFA), it is to be understood that various other rare earth materials may be used in the formation of a doped fiber amplifier (with the proper pump wavelength used as a function of the dopant). Thus, while portions of the following discussion will refer to "EDFA", it is to be understood that the configurations are equally applicable to any type of doped fiber amplifier. Moreover, the utilization of discrete optical components and free-space signal paths may be incorporated within a distributed Raman amplifier (DRA) or semiconductor optical amplifier (SOA) also formed in accordance with the present invention, as will be discussed in detail below.

In particular, each stage within the inventive multi-stage optical amplifier is configured in a manner that allows for discrete optical components to perform the desired functionality, with free-space optical paths directing the signals and pump light through the various stages. Moreover, as mentioned above, the modularity of the inventive configuration allows for different specific subsystems to be inserted or deleted, as necessary. For example, with respect to Stage 3 (the signal "conditioning" stage), a first embodiment may be configured to provide a variable optical attenuation (for output power adjustments), a second embodiment may be configured to provide tunable optical filtering (for removing residual noise in the amplified signal), or a third embodiment may be used that includes both a VOA and TOF (as well as many different specific attenuator or tunable filter designs themselves).

Figure 5:
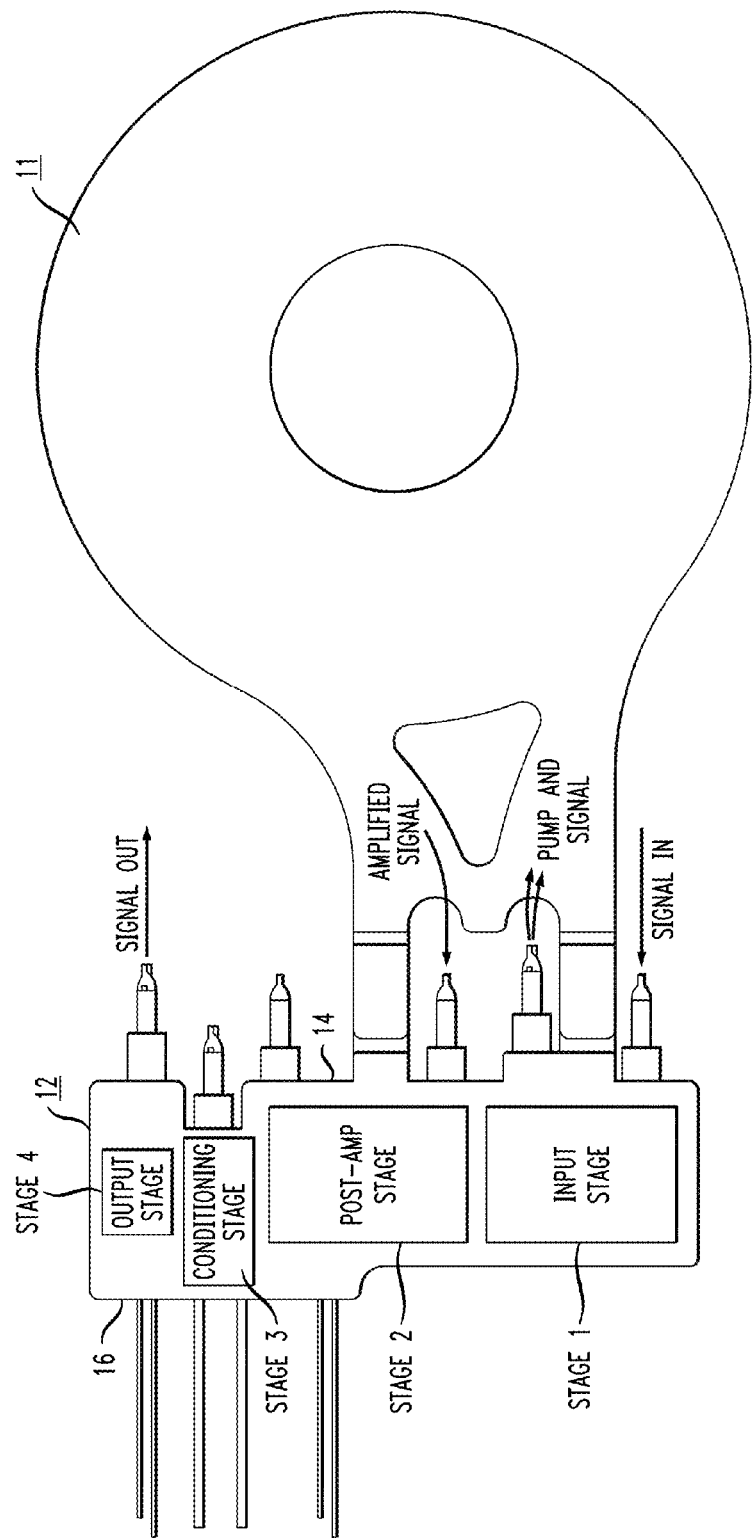
FIG. 5 illustrates an exemplary housing and associated doped fiber amplifier component that may be used in the assembly of a multi-stage optical amplifier in accordance with the present invention.

FIG. 5 is a diagram of an exemplary optical amplifier module 10, formed in accordance with the present invention, that provides each of the various optical amplifier "stages" described above utilizing free-space optics. As shown, the various stages are disposed within a housing 12 formed of a suitable material (for example, Kovar). A separate, external amplifier arrangement 11 is used to support a coil of doped optical fiber (not shown), where amplifier arrangement 11 is coupled to module 10 via optical fiber pigtails. Functioning in a well-known manner, amplifier arrangement 11 receives the co-propagating input optical signal and pump light from input stage 1 and returns an amplified optical signal as an input to post-amplifier stage 2 of module 10. As will be discussed in detail below, the various optical fiber-based input and output signal paths are preferably positioned along a common sidewall 14 of housing 12. In this particular configuration, external amplifier arrangement 11 also couples to input stage 1 and post-amp stage 2 through sidewall 14. Electrical power (as required for monitoring photodiodes and other active components) may be provided via contacts formed through a common wall of housing 12, shown in this case as opposing sidewall 16. The specific location and configuration of the electrical contacts may vary, on a case-by-case basis, in accordance with specific customer requirements.

As evident from FIG. 5, the use of separate stages of discrete optical components, with free-space beams propagating within each stage, allows for a relatively compact structure to be created. The utilization of fiber pigtails along a single sidewall of the amplifier housing minimizes the complexity of the operations used to deploy this type of amplifier module (e.g., forming a "field pluggable" arrangement). Indeed, the amplifier arrangements of the present invention can be assembled with automated methods. As a result of this automation, optical amplifier modules formed in accordance with the present invention can be made using a highly repeatable process with high yield and low cost, creating an optical amplifier module that exhibits a relatively small footprint (compared to prior art "hybrid" amplifier configurations using fiber-connected elements). With this overview, the various details and alternatives utilized for each stage within the inventive optical amplifier module will now be described in detail.

Figure 6:
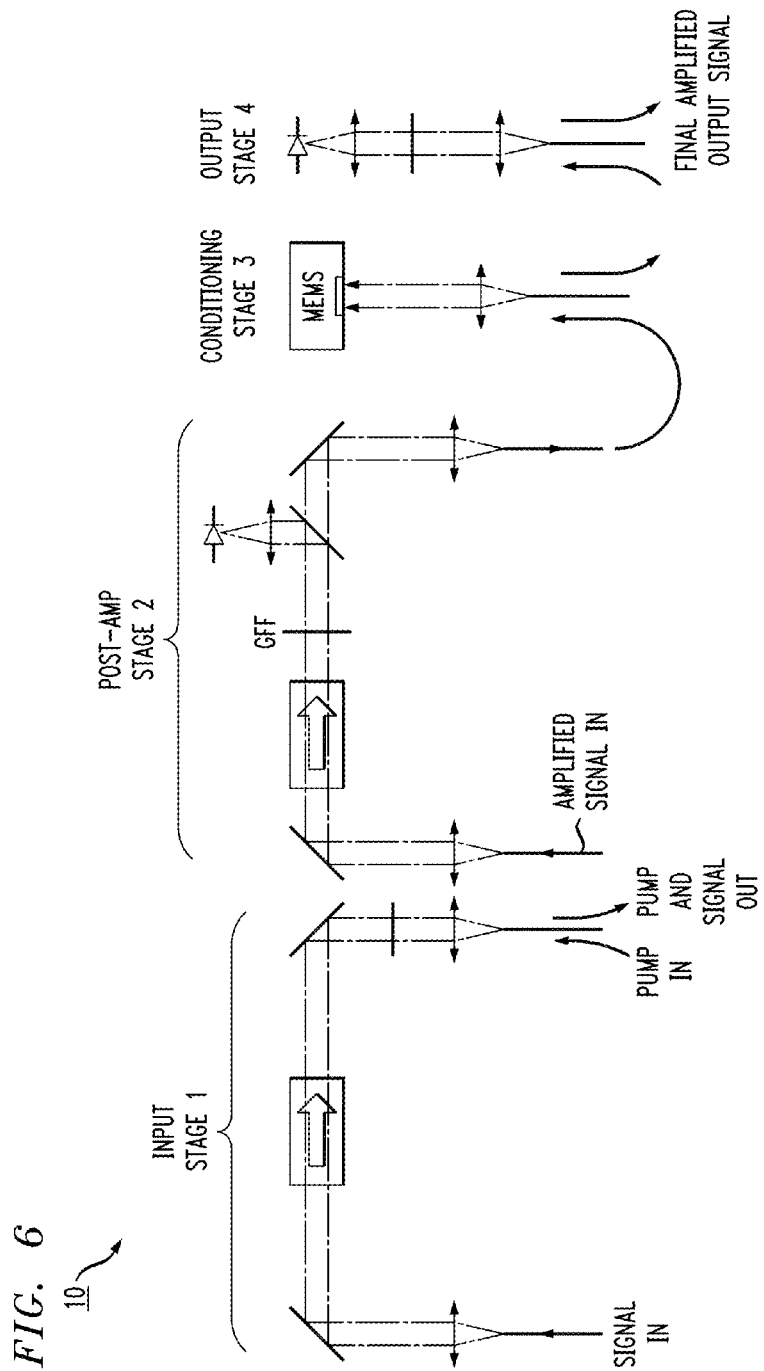
FIG. 6 is a simplified diagram of the discrete devices and free-space signal paths utilized to form an exemplary erbium-doped fiber amplifier (EDFA) in accordance with the principles of the present invention.

FIG. 6 is a simplified diagram of the various discrete optical components disposed within housing 12 and utilized in the configuration of an exemplary optical amplifier module 10 formed in accordance with the present invention. The various free-space beams (dotted lines) are also shown as propagating between discrete components within each stage. Each stage of optical amplifier module 10 is identified in the view of FIG. 3, with the specific discrete components associated with each stage illustrated in diagrammatic form. It is to be understood that the various optical inputs and outputs to optical amplifier module 10 are provided by optical fibers (preferably enclosed within sleeve connectors to hold the fibers in place, often referred to in the art as "optical pigtails"). In accordance with a preferred embodiment of the present invention, the plurality of fiber pigtails necessary to couple the inventive optical amplifier module to both the transmission path and fiber amplifier terminate along a common wall.

As shown in FIG. 6, and discussed in detail below, the input stage of optical amplifier module 10 is utilized to combine the incoming optical signal and pump light in a manner that presents the beams as co-propagating inputs to the external fiber amplifier arrangement (not shown). The amplified optical signal output from the external fiber amplifier arrangement is then applied as an input to the post-amp stage 2 of optical amplifier module 10. This post-amp stage provides gain flattening (or otherwise modifies the gain profile of the amplified optical signal) as a function of wavelength. In the arrangement as shown in FIG. 3, the output from the post-amp stage is directed into the "signal conditioning" stage 3 that is used to adjust the power level of the propagating amplified signal, allowing for the final amplified output signal (from output stage 4) to be at a predetermined, preferred power level. Monitoring photodetectors are shown as being included in Stages 2 and 4, where these devices a receive a small portion of the propagating optical signal (via associated optical taps) and use this out-coupled signal to monitor the operation of the optical amplifier module (i.e., providing closed-loop control).

With this understanding of the optical and mechanical arrangement of the discrete optical components and free-space beams propagating within optical amplifier module 10, each separate stage will now be described in detail.

Figure 7:
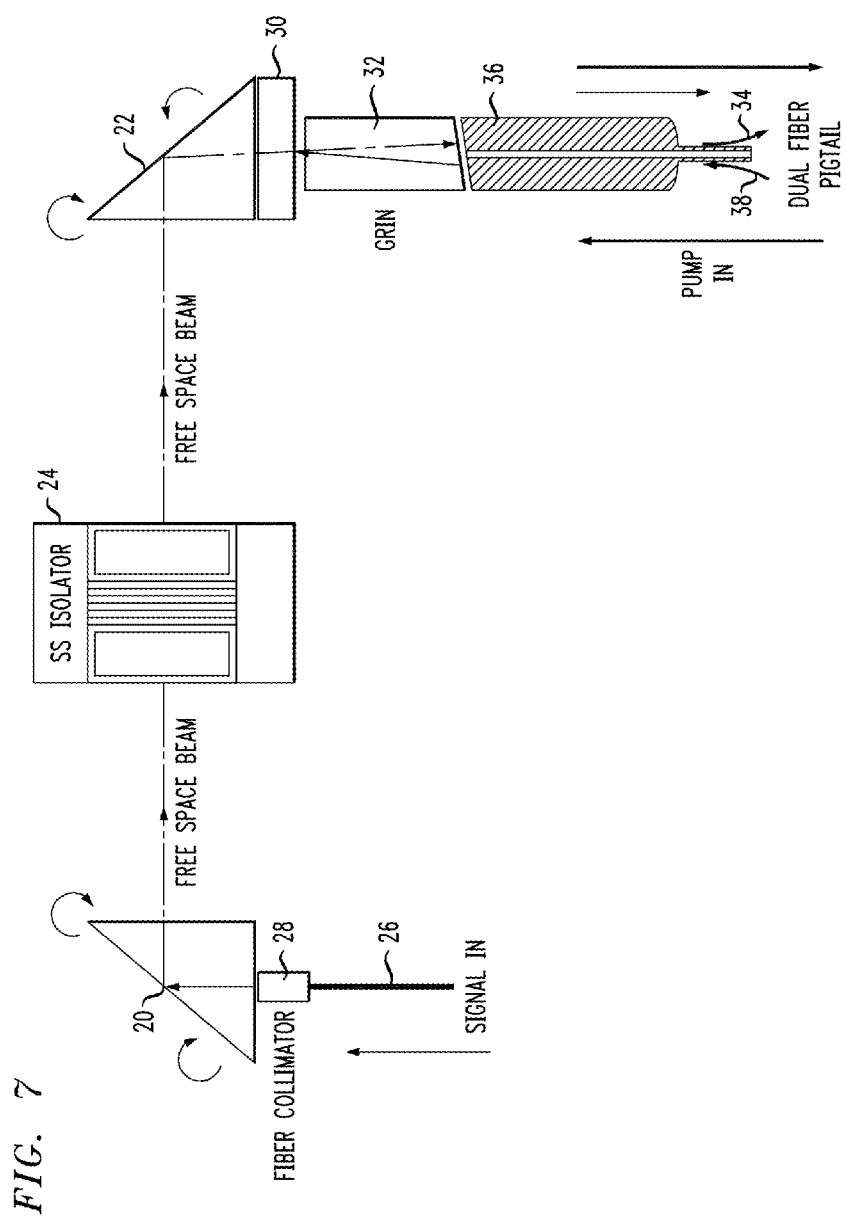
FIG. 7 is a detailed view of the discrete optical components and free-space beam paths forming the input stage of the multi-stage optical amplifier module as shown in FIG. 6.

FIG. 7 is a detailed diagram of an exemplary input stage of module 10, showing both the various discrete optical devices and the free-space signal paths through the input stage. In particular, the input stage is shown as comprising a first turning mirror 20 and a second turning mirror 22, with an optical isolator 24 disposed in the free-space signal path between the pair of turning mirrors. In accordance with the present invention, all of these elements take the form of discrete optical components, with the incoming optical signal propagating in free-space through the arrangement. Isolator 24 is utilized to prevent reflections (both optical signal and pump light) from propagating in the reverse direction along the input optical signal path (isolator 24 may be either a single-stage isolator or a multi-stage isolator). Advantageously, the inclusion of the turning mirrors allows for the optical signal path to be folded in a manner such that all of the optical inputs and outputs enter/exit along a common sidewall 14 of housing 12 (as shown in FIG. 5).

An input optical signal is shown in FIG. 4 as entering optical amplifier module 10 via an input optical fiber 26 and collimating lens 28. Collimating lens 28 functions to convert the free-space expanding beam exiting optical fiber 26 into a configuration of parallel rays (i.e., "collimated" beam). The collimated free-space beam exiting lens 28 is then re-directed by first turning mirror 20 to pass through optical isolator 24 and impinge second turning mirror 22. The free-space beam reflected by second turning mirror 22 then passes through a wavelength division multiplexer (WDM) element 30 and a focusing lens 32 (e.g., a graded-index (GRIN) lens or cylindrical lens (c-lens)), where focusing lens 32 functions to couple the free-space optical signal into a first optical fiber 34 of a dual fiber pigtail 36.

As discussed above, the angular position of turning mirrors 20 and 22 is adjusted (indicated by curved arrows in the drawing) during assembly until maximum coupling is provided between the input optical signal path (along fiber 26) and the output optical signal path (along fiber 34). Various techniques, well-known in the art, may be used to measure the coupling efficiency between the input and output and adjust the positioning of one or more both mirrors until a maximum coupling efficiency is achieved. Once the optimum positions of mirrors 20 and 22 is determined, the devices are fixed in place using an appropriate solder or epoxy material (or any other suitable means of attaching to housing 12). It is also to be noted that while the diagram of FIG. 7 illustrates the various discrete optical components as being relatively spaced apart, in actual assembly the devices are close together, thus minimizing problems with beam divergence (given the relatively small beam diameter).

In accordance with this particular EDFA configuration of the present invention, the pump light necessary to create amplification is provided by an external pump laser source (not shown), with the pump light being coupled into the input stage via a second optical fiber 38 of dual fiber pigtail 36. As shown, the pump light exits second fiber 38 within module 10 as an expanding beam, which is thereafter collimated as it passes through lens 32. The collimated free-space pump beam next encounters WDM 30. WDM 30 is particularly configured such that the specific wavelength of the pump light (for example, 980 nm) is reflected, while the wavelength of the input optical signal (operating at, for example, 1550 nm) passes through unimpeded. As the reflected, free-space pump light passes again through lens 32, it is coupled into first optical fiber 34, so as to co-propagate with the input optical signal and thereafter be coupled into the external fiber-based amplifier component (not shown in FIG. 4). As with turning mirrors 20, 22, it is possible to adjust the angular position of WDM 30 with respect to the output signal path so as to minimize insertion loss at output fiber 34.

Although not particularly depicted in the arrangement of FIG. 7, various embodiments of the present invention may utilize a fiber Bragg grating (FBG) component in the signal path at the exit of this input stage. In some cases, an FBG may be included within a section of optical fiber 34 and used to limit the passband of the propagating optical signal to the absorption band of the Er-doped fiber within the amplifier component (not shown). Obviously, in cases where the gain fiber has a broad absorption spectrum, it is not necessary to include an FBG at the exit of the output stage (i.e., at the input to the doped fiber amplifier arrangement).

While the embodiment illustrated in FIG. 7 shows the use of two separate fibers (34, 38) to carry the pump input (fiber 34) and the co-propagating pump and optical signal outputs (fiber 38), it is to be understood that there are other arrangements that may be used, including, for example, a "dual-core" optical fiber (or in general, a multi-core optical fiber). Additionally, inasmuch as the propagating pump light and the input optical signal exhibit different mode field diameters (MFDs), a specialty fiber particularly well-suited to efficiently couple both the pump and signal into the fiber amplifier (e.g., a thermally-expanded core fiber, or TEC fiber) may be used as optical fiber 34 (or at least a portion of optical fiber 34).

For the purposes of describing the remaining subsystem components (i.e., "stages") of optical amplifier module 10 disposed within housing 12, it will be presumed that the input optical signal has been amplified (for example, within external amplifier arrangement 11 as shown in FIG. 5). Referring again to FIG. 6, the amplified optical signal exiting amplifier arrangement 11 is subsequently applied as an input to the post-amp stage of module 10 (also referred to at times as "Stage 2").

Figure 8:
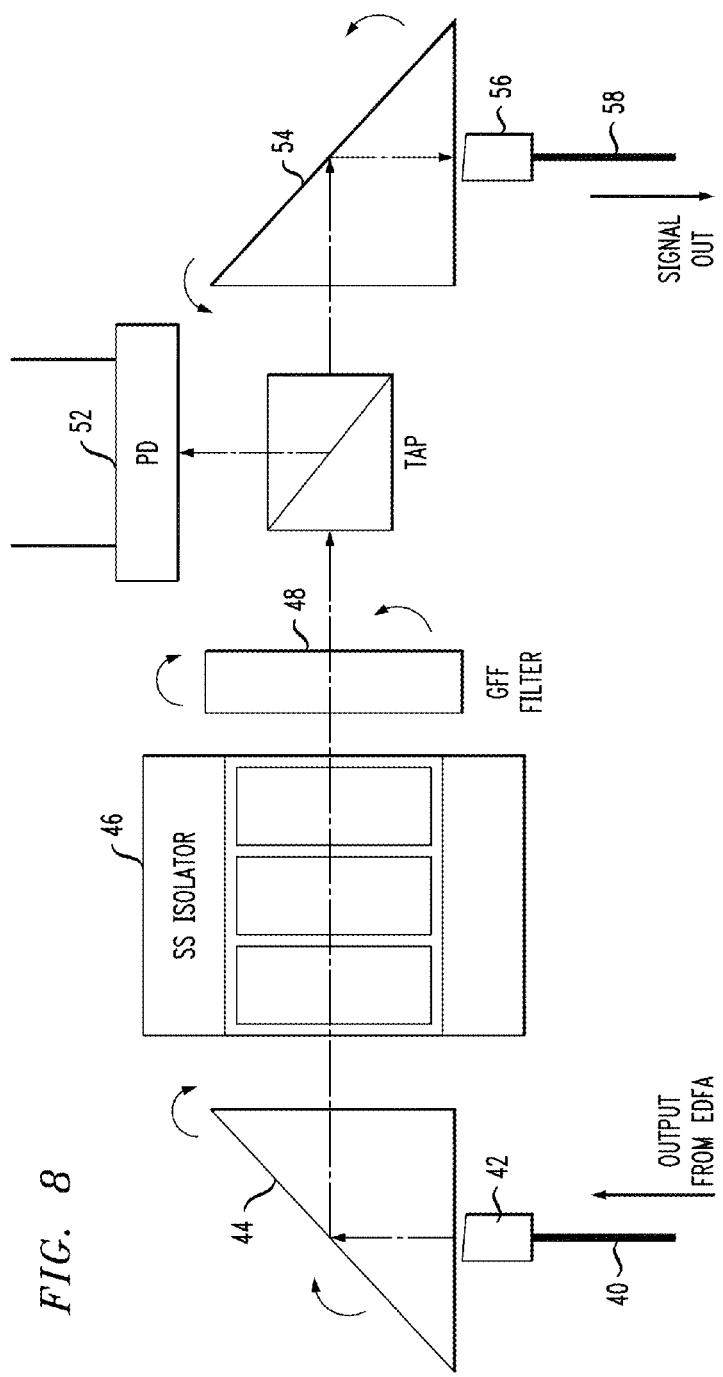
FIG. 8 is a detailed view of the discrete optical components and free-space beam paths forming the post-amplifier stage of the multi-stage optical amplifier module as shown in FIG. 6.

FIG. 8 illustrates in detail an exemplary grouping of discrete components and free-space optical signal paths associated with the post-amp stage of module 10. The amplified signal (received as an output from the amplifier component) is shown as introduced into module 10 via an optical fiber 40. The amplified signal exits optical fiber 40 as an expanded beam and thereafter passes through a collimating lens 42. The collimated, free-space amplified optical signal is subsequently re-directed by a turning mirror 44 to pass through an optical isolator 46 and a gain flattening filter (GFF) 48. Similar to the input stage, isolator 46 is used to prevent reflections from re-entering the input optical signal path. As is known in the art, a gain flattening filter is used in conjunction with a multi-wavelength amplified signal to adjust the amount of optical gain that has been created for the various, separate wavelengths within the doped fiber gain medium. In most cases, a gain "flattening" filter is used to adjust the gain associated with each wavelength such that an essentially uniform gain profile is created across the wavelength spectrum of the amplified signal. In a more general sense, this filter can be used to adjust the gain profile to exhibit any desired distribution. In cases where optical amplifier 10 is operating as a "single wavelength" amplifier, GFF 48 can function to eliminate the amplified spontaneous emission (ASE) outside of the signal band, thus improving the signal-to-noise ratio, as well as the noise figure, of the amplified output signal.

As shown in FIG. 8, the free-space beam output from GFF 48 passes through an optical tap 50, which functions to direct a small percentage of the amplified signal into a monitoring photodiode 52, with a majority of the "gain flattened" signal directed by optical tap 50 into a turning mirror 54. Turning mirror 54 is oriented to re-direct the free-space beam in the proper direction toward the output of the post-amp stage. As shown, the re-directed, gain-flattened amplified optical signal (as a free-space beam) passes through a focusing lens 56 and is focused into an output fiber 58. The relatively small signal received by photodiode 52 is converted into an electrical control signal, which may be used to adjust the orientation of GFF 48 until the desired gain profile is achieved.

Similar to the assembly of the input stage, the angular positioning of turning mirrors 44, 46 is adjusted to minimize insertion loss related to beam pointing and displacement errors. Additionally, the position of GFF 48 is adjusted ("tunable") to achieve maximum coupling efficiency.

Referring back again to the particulars of optical amplifier module 10 as shown in FIGS. 4 and 6, a "signal conditioning" stage (Stage 3) is included in this particular embodiment, and in this case includes a variable optical attenuator (VOA) component to adjust the optical power appearing along the output signal path. While GFF 48 included in the post-amp stage is useful in modifying the gain profile as a function of wavelength, it does not specifically change the overall power level exhibited by the gain-flattened signal. To that end, a VOA may be included in amplifier module 10 to control the power in the output signal and control the insertion loss (IL) present along the output signal path. As discussed above, this stage is optional, and the "gain-flattened" signal may otherwise be directed introduced into the output stage of optical amplifier 10.

Figure 9:
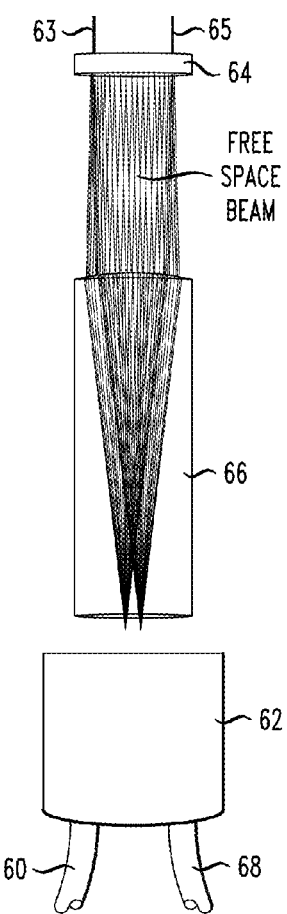
FIG. 9 is a detailed view of the discrete optical components and free-space beam paths forming the signal conditioning stage of the multi-stage optical amplifier module as shown in FIG. 6.

Presuming that a signal conditioning stage is included in optical amplifier module 10, the specific components of this stage are depicted in FIG. 9. As shown, the gain-flattened output signal from the previous post-amp stage enters the output stage via a first fiber 60 of a dual fiber pigtail 62. In the specific embodiment shown in FIG. 9, the signal conditioning stage takes the form of a variable optical attenuator (VOA) and is used to ensure that a defined power level is not exceeded by the amplified output signal. In this particular embodiment, the power adjustment is provided by a MEMS element 64, where the orientation of MEMS element 64 is electrically controlled in a known manner to adjust the power level of the propagating free-space optical signal.

In particular, the gain-flattened, amplified expanding beam exiting fiber 60 first passes through a collimating lens 66 and thereafter impinges MEMS element 64. The placement of MEMS element 64 along the axis of the incoming free-space optical signal in this particular configuration is considered to reduce the complexity of the assembly and organization of module 10. As is known in the art, the mirrored surface of MEMS element 64 is rotated about different axes until the optimum output signal (in terms of optical power) is created. The re-oriented, power-controlled beam is reflected by MEMS element 64 and again passes through lens 66. In this direction, lens 66 focuses the power-adjusted amplified beam into a second optical fiber 68 of dual fiber pigtail 62, forming the output from Stage 3 of optical amplifier module 10.

Figure 10:
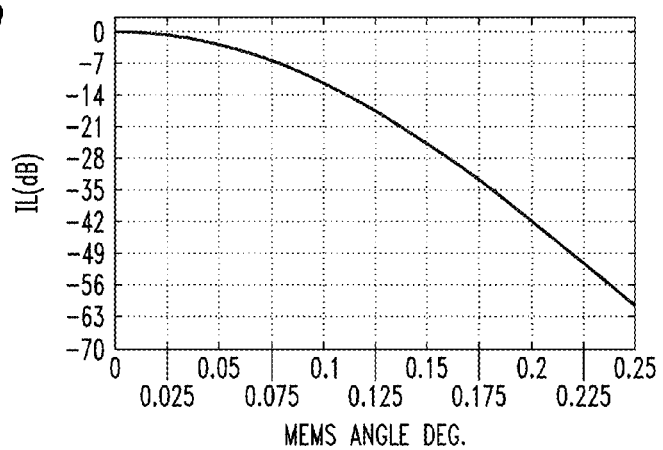
FIG. 10 is a graph of insertion loss as a function of MEMS orientation for an exemplary signal conditioning stage as shown in FIG. 9.

FIG. 10 is an exemplary plot, showing changes in optical power (in terms of insertion loss) as a function of the angle of an exemplary MEMS element. For this particular example, an orientation of the MEMS device at an angle of about 0.168° provides a 30 dB power adjustment. As mentioned above, an electrical control signal applied to MEMS element 64 via electrodes 63, 65 is used to adjust the tilt of MEMS element 64 until the desired output power level is obtained.

Figure 11:
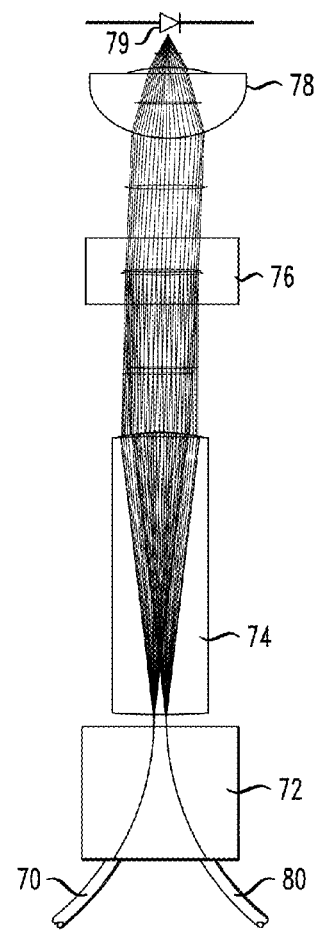
FIG. 11 is a detailed view of the discrete optical components and free-space beam paths forming the output stage of the multi-stage optical amplifier module as shown in FIG. 6.

Once the desired power level is established, the amplified signal exiting conditioning stage 3 is coupled into the output stage of module 10, as shown in FIG. 11. In particular, the power-adjusted amplified signal is coupled into a first optical fiber 70 of a dual fiber pigtail 72 to enter the output stage of multi-stage optical amplifier module 10. The incoming signal exits fiber 70 as an expanding beam that is collimated by a lens 74 prior to impinging an optical tap 76. Optical tap 76 is designed to reflect a majority of the impinging beam (say, 95%), with the remainder passing through optical tap 76. The small portion passing through optical tap 76 is focused by a lens 78 into a monitoring photodiode 79. As is well-known in the art, photodiode 79 functions to convert the captured light into an electrical signal that may be used to assess the performance of optical amplifier module 10 and provide closed-loop control of various components, as necessary.

As shown in FIG. 11, the portion of the free-space beam reflected by optical tap 76 makes a second pass through lens 74, which in this direction functions to focus the reflected beam into a second optical fiber 80 of fiber pigtail 72. The amplified optical signal exiting housing 12 along second optical fiber 80 is defined as the amplified optical output signal of optical amplifier module 10.

In a preferred configuration of this embodiment of the present invention, the various fiber-based connections between Stages 2, 3 and 4 take the form of "pre-spliced" optical fiber pigtails. As such, the core regions of the fibers are already aligned, and the length of the fibers forming the pigtails can be minimized in a further effort to reduce the overall size and complexity of the optical amplifier module.

It is to be understood that a compact, multi-stage optical amplifier module formed in accordance with the present invention should take into consideration the various materials, assembly processes, and conditions that must be met to achieve and maintain optical alignment within the system. That is, the formation of a free-space optics multi-stage optical amplifier module requires a thorough consideration of the materials used to form the various components, as well as the assembly processes used to provide the final product. Furthermore, the optical beam will experience transverse offsets that lead to angle changes at the ultimate output fiber connection. Additional sources of loss can be attributed to pointing errors and beam tilt errors. All of this angular sensitivity associated with free-space optics means that after traversing through the various discrete optical components, it is important that any misalignment must be recognized and compensated for. The ability to measure and compensate for these optical system errors requires that the alignment system has sufficient resolution and sensitivity and, moreover, does not change during subsequent fabrication steps (e.g., epoxy bonding, laser welding, thermal process, etc.) or as the optical amplifier module is subjected to environmentally-induced changes. In most cases, as discussed above, the pairs of folding mirrors are utilized as compensators for these beam-related problems, where the angular positioning of these mirrors is adjusted during assembly to address these issues.

Figure 12:
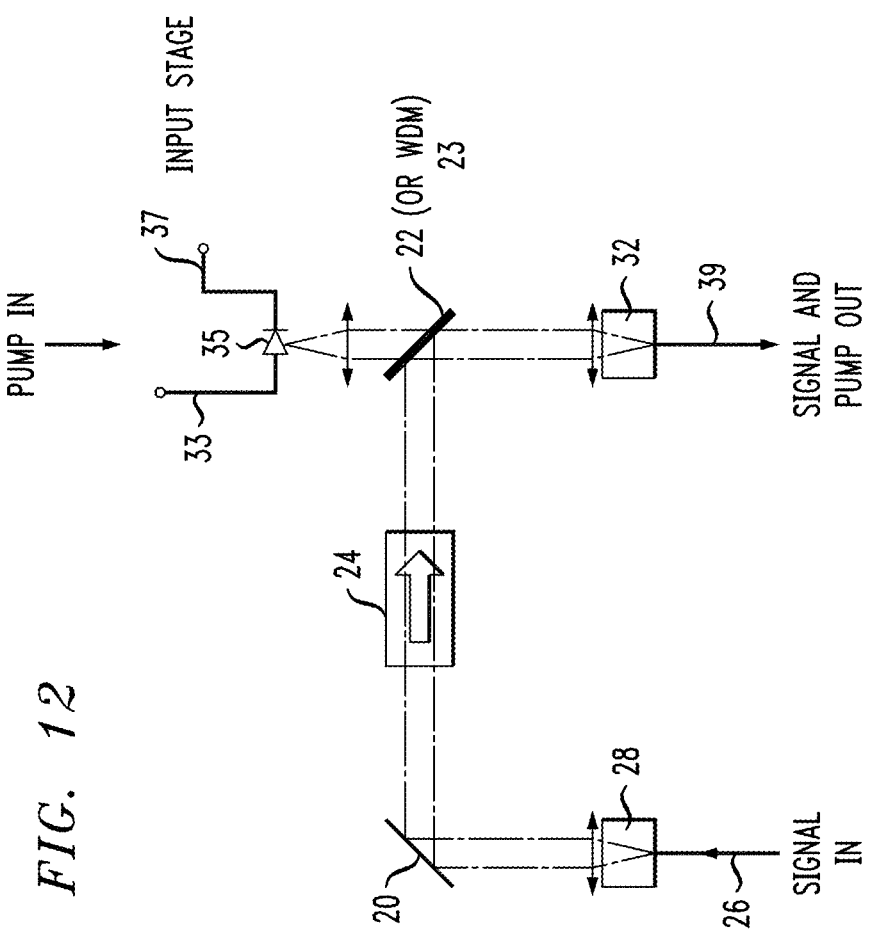
FIG. 12 depicts an alternative embodiment input stage of a multi-stage optical amplifier formed in accordance with the present invention, where in this embodiment a discrete laser diode used as a pump source is integrated with the other discrete components.

An alternative configuration of an input stage for optical amplifier module 10 is shown in FIG. 12. In this embodiment, a pump source (in the form of a laser diode) is included as a discrete component within the input stage of the multi-stage optical amplifier. In particular, a discrete laser diode 35 is positioned as shown in FIG. 12 to direct pump light along the same beam path as the input optical signal. As with monitoring photodiodes 52 and 79 described above, pump laser diode 35 is disposed within housing 12, with its associated electrodes 33, 37 exiting through sidewall 16 (for example) of housing 12. Thus, in accordance with the principles of the present invention, the use of free-space optics (in this case, the light output from pump laser diode) reduces the number of separate fibers that are required to implement the optical amplifier.

Inasmuch as the incorporation of a discrete pump laser diode within housing 12 of optical amplifier module 10 eliminates the need for an optical fiber connection to bring the pump light into the amplifier, a dual fiber pigtail is not required as the connection between module 10 and amplifier arrangement 11 (as is necessary for the previously-described embodiment). Thus, as shown in FIG. 12, output fiber 34 is coupled into external amplifier arrangement 11 through a "single fiber" pigtail 39. In comparing the configuration of FIGS. 5-7 to that of FIG. 12, it is clear that the inclusion of a discrete pump source emitting a beam in the same direction as the input optical signal also eliminates the need for a WDM in the signal path between second turning mirror 22 and output fiber 34. While it is possible that proper lensing of pump laser diode 35 may be sufficient to provide pump light that passes essentially unimpeded through second turning mirror 22, it may be necessary to replace second turning mirror 22 with some type of directional coupler (a WDM 23, for example) to combine the pump light and optical signal onto the same path. Regardless of the optics required on the input side, the configuration as shown in FIG. 12 is simplified with respect to the previously-described embodiment and exhibits a reduced component count over the embodiment of FIGS. 5-7.

Figure 13:
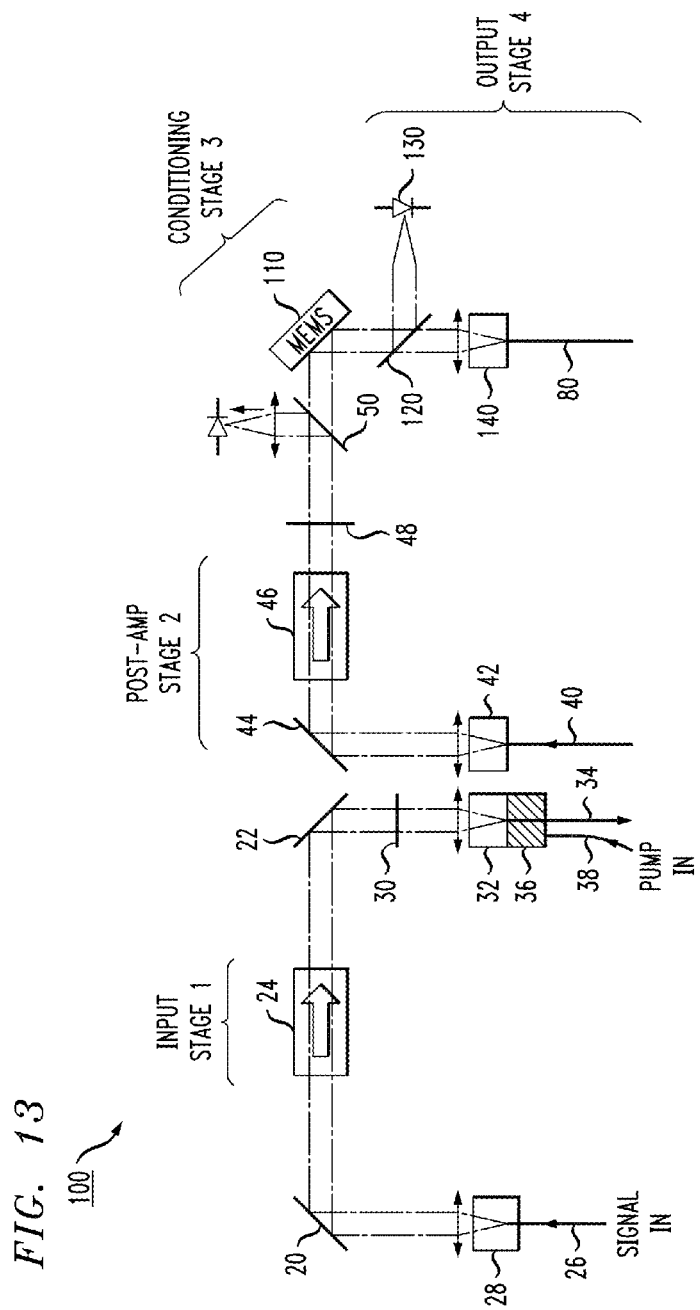
FIG. 13 is a diagram of yet another embodiment of the present invention, in this case combining the discrete optical components of the post-amplifier, conditioning and output stages.

FIG. 13 is a simplified block diagram view of a portion of yet another embodiment of the present invention, in this case where the fiber-based connections between Stages 2, 3, and 4 are eliminated and the propagating optical signal remains within the confines of module 10 (i.e., within housing 12) as a free-space beam as it passes through these stages, thus further reducing the number of fiber pigtails and coupling optics within the optical amplifier.

In particular, FIG. 13 illustrates an optical amplifier module 100, which maintains the modularity of the present invention, in terms of utilizing identified Stages 1-4 that perform the same optical functions as described above. Indeed, the elements comprising Stages 1 and 2, as well as the coupling into and out of external amplifier arrangement 11 are similar to the configurations described above.

In accordance with this particular embodiment of the present invention, optical amplifier module 100 is configured to avoid the need to couple the propagating (amplified) free-space signal into and out of optical fiber pigtails between Stages 2, 3, and 4. Instead and as shown in FIG. 13, the amplified optical output signal from Stage 2 (i.e., the beam passing through optical tap 50) is directed as a free-space beam into a MEMS element 110, which functions as a "signal conditioning" variable optical attenuator in this embodiment.

In this free-space configuration of FIG. 13, MEMS element 110 is oriented at a 45° angle so that it may also function as a turning mirror and "fold" the direction of the propagating beam back toward the optical termination sidewall of the housing (such as sidewall 14 of housing 12, as shown in FIG. 2). The positioning of MEMS element 110 (as well as turning mirrors 20, 22 and 44) may also be adjusted to compensator for beam displacement and pointing error conditions associated with the free-space beam paths. This orientation of a MEMS element is known to introduce other design details that need to be addressed in order to provide optimum results. The free-space beam output from MEMS element 110 passes through a second optical tap element 120, with a small portion of the beam directed into a photodiode 130 used to monitor the overall performance of optical amplifier module 100. As before, the majority of the amplified beam passes directly through optical tap element 120 and enters a lens 140, which functions to focus the beam into a designated output path (such as optical output fiber 80).

In the configuration of optical amplifier 100 as shown in FIG. 13, the need to use fiber pigtails between Stages 2, 3 and 4 is eliminated (when compared to the previously-described embodiments), but the design itself becomes more complicated, particularly with respect to the MEMS component. In an alternative arrangement of optical amplifier 100, a tunable optical filter component (not shown) can be disposed between first optical tap 50 and MEMS element 110, or between MEMS element 110 and second optical tap 120, and used to reduce noise within the amplified signal.

Figure 14:
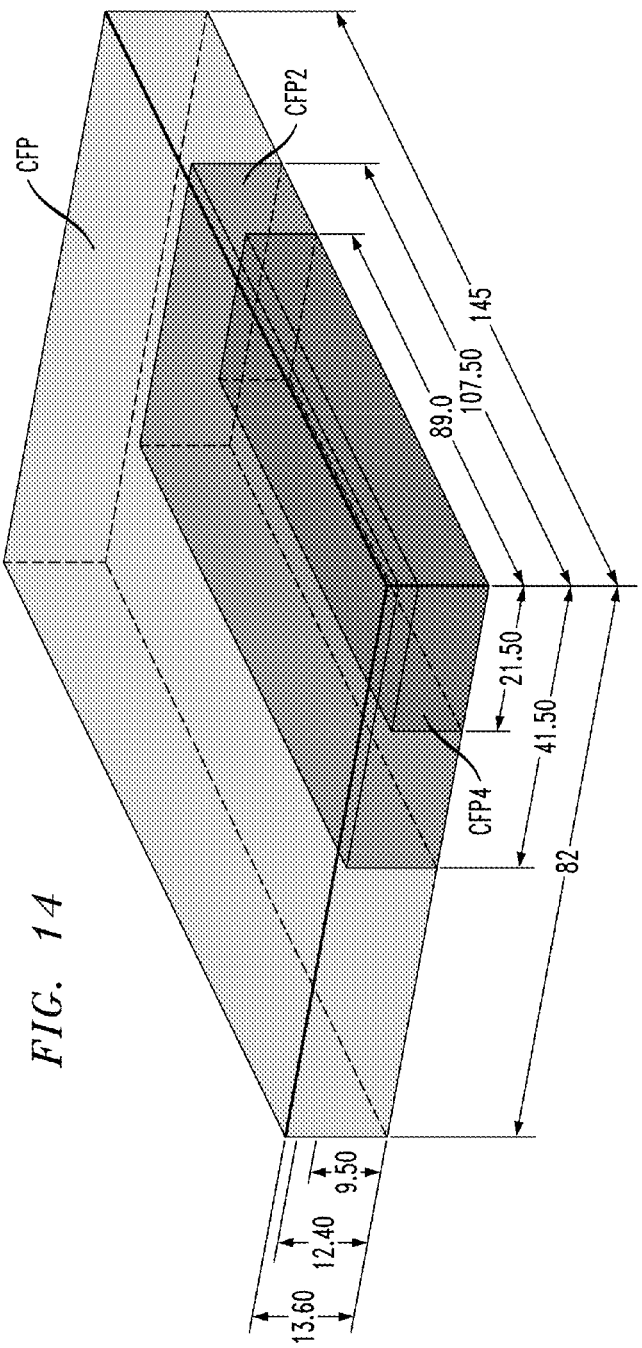
FIG. 14 is a diagram showing the different dimensions associate with a CFP package, a CFP2 package, and a CFP4 package.

While the free-space optical amplifier configurations described thus far are a significant improvement over prior art, fiber-based arrangements, the freedom associated with discrete components and free-space transmission paths has been found to allow for an even more compact configuration of the optical components to be achieved. As optical communication systems migrate from industry-defined CFP dimensions to smaller CFP2 dimensions (with the embodiments described thus far useful for CFP2-based packages) and to even-smaller CFP4 (or XFP) dimensions, the ability to use free-space signal paths in accordance with the present invention provides significant advantages. FIG. 14 is a diagram illustrating the reduction in overall size of an exemplary optical transponder for each generation of CFP, with the understanding that the optical amplifier module is only one component to be housed within these dimensions.

Figure 15:
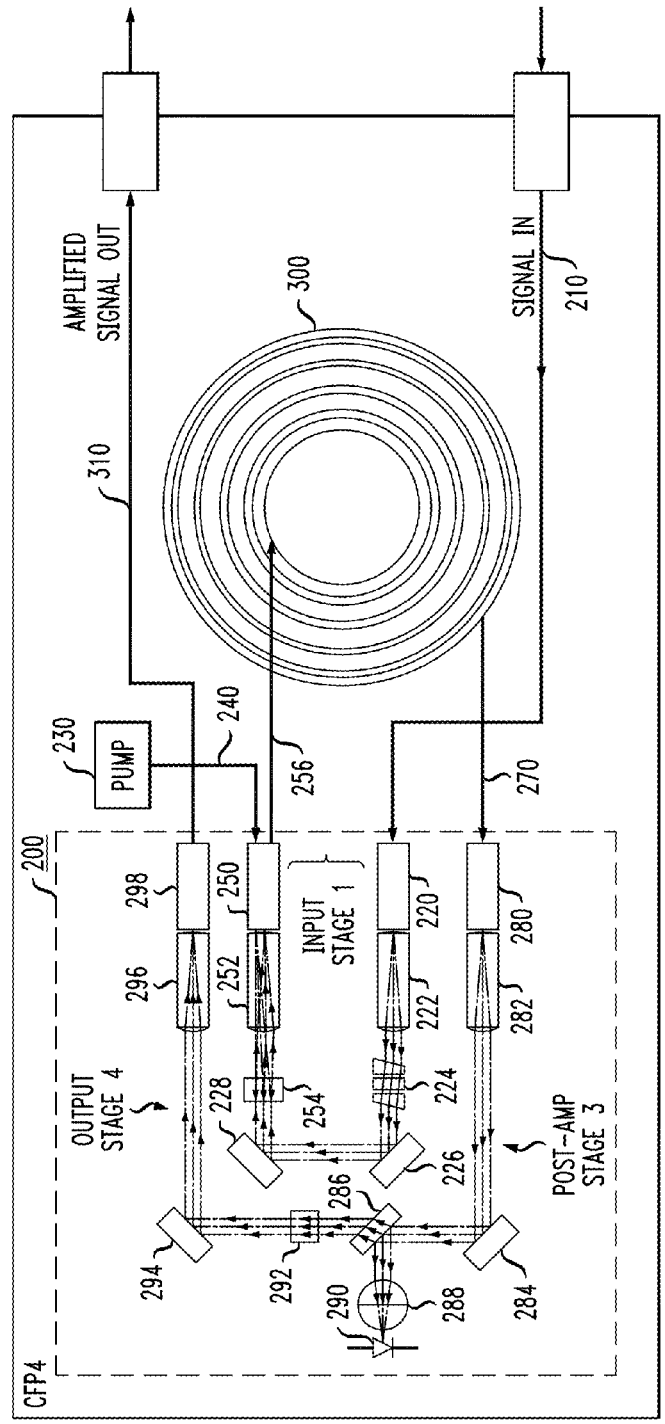
FIG. 15 is a diagram of an exemplary optical amplifier utilizing discrete optics and free-space beam paths in accordance with the present invention and configured to fit within the dimensions of a CFP4 package.

FIG. 15 is a top view of an exemplary optical amplifier module 200 formed in accordance with the present invention that is able to be housed within the dimensions associated with a CFP4 package. As shown, the free-space optics have been re-configured (with respect to the previous embodiments) so that the stages are essentially nested, instead of extending linearly in sequence along the length of the housing.

In this particular configuration, the optional Stage 3 signal conditioning operations (e.g., output power level adjustment, noise filtering, etc.) are not used. The remaining stages are arranged in a nested configuration, with input stage 1 formed as an "inner" stage, and the optics of Stages 2 and 4 disposed as an "outer" stage to surround the input stage and create the nested configuration. As shown, the optical input signal enters the CFP4 package along an input fiber 210, which is coupled via a first fiber pigtail 220 to enter the input stage of optical amplifier module 200. The input signal passes through a collimator 222 and an optical isolator 224. A pair of turning mirrors 226, 228 is used to re-direct the collimated free-space input signal beam along a path toward the doped fiber 300 used to provide the amplification. As before, these turning mirrors are adjusted during assembly so as to minimize insertion loss at the output of the input stage.

Doped fiber 300 is shown as housed within the CFP4 package with optical amplifier module 200. A stand-alone pump source 230 is also included within the CFP4 package, and is used to provide pump light along a fiber 240 within a (dual fiber) second fiber pigtail 250. The pump signal passes through a collimating lens 252 and enters a WDM 254. As with the embodiments described above, WDM 254 is configured to pass the wavelength(s) associated with the input signal and reflect the pump wavelength. Thus, WDM 254 is used here to direct both the signal and the pump light through collimating lens 252 and then into a second fiber 256 within dual fiber pigtail 250.

The presence of pump light with the input signal within doped fiber 300 results in amplifying the input signal, which then exits doped fiber 300 along the signal path shown as forming the input to the outer combination of stages forming the nested configuration. In particular, the amplified signal is provided as an input to combined Stages 2 and 4 of optical amplifier module 200 via an optical fiber 270 coupled to a third fiber pigtail 280. The amplified signal passes through a collimating lens 282 and is then directed by a turning mirror 284 along an "outer" free-space signal path. An optical tap 286 may be used to direct a small fraction of the amplified signal through a focusing lens 288 and into a monitoring photodiode 290.

As with the above-described embodiments, the monitored signal may be used to adjust the orientation (or other properties) of a gain flattening filter 292. The gain-adjusted version of the amplified signal is then re-directed by a turning mirror 294 into a free-space output signal path. This free-space signal is then focused by a lens 296 into an optical fiber pigtail 298 encasing the amplifier output fiber 310.

It is contemplated that the free-space optics configuration of an optical amplifier module of the present invention may also be formed to incorporate components utilized to provide distributed Raman amplification (DRA) within an optical communication system. Unlike the EDFA embodiments described thus far, a DRA does not require the use of the specialty type of doped fiber. Instead, amplification is achieved by a nonlinear interaction between the optical signal and high-power laser pulses (i.e., "Raman pulses") that are injected into the conventional transmission fiber supporting the propagation of the optical signal.

Figure 16:
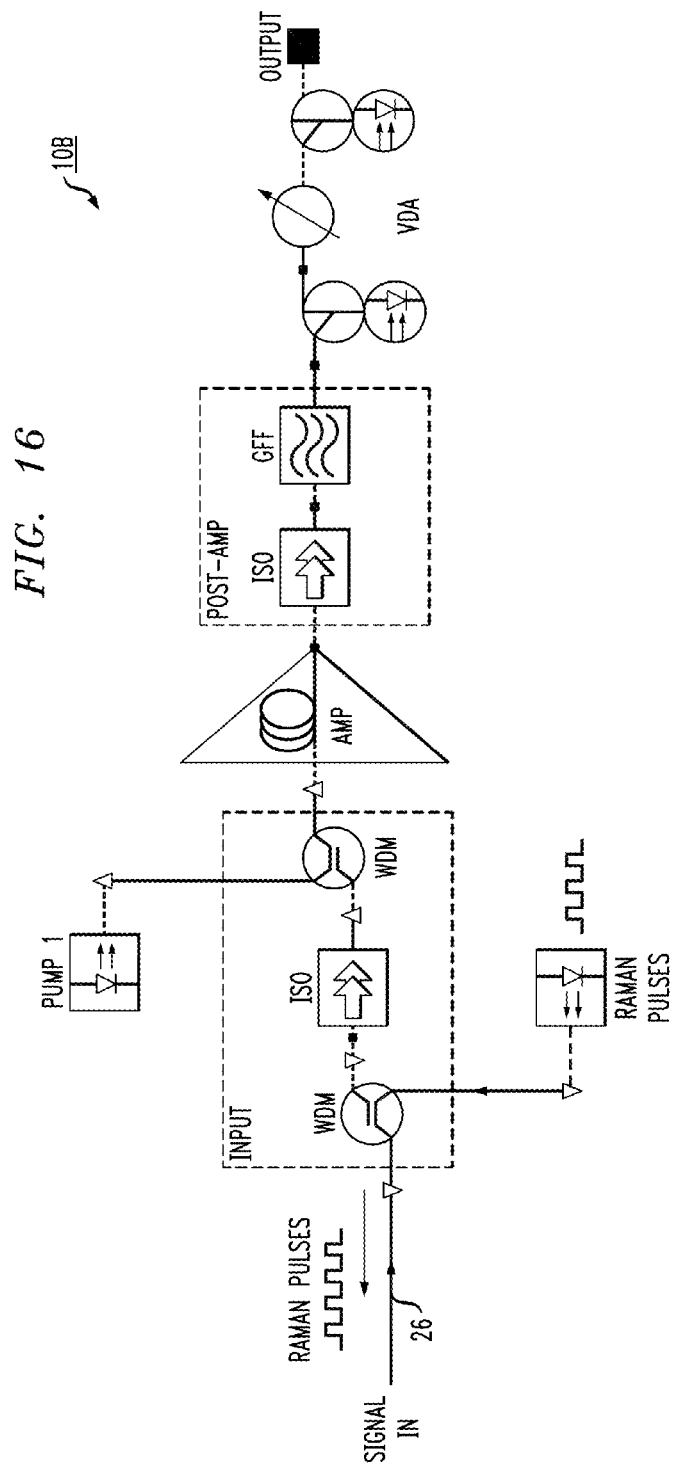
FIG. 16 is a block diagram of a typical optical amplifier utilizing distributed Raman amplification (DRA) to provide optical gain for a propagating optical input signal.

FIG. 16 is a block diagram illustration of an exemplary optical amplifier module 10B of the present invention, similar to that shown in FIG. 4, but in this case configured to introduce Raman pulses, via the input stage, in an upstream direction along input fiber 26. As shown in FIG. 16, the Raman pulses pass through an additional WDM component included in the input stage, so that the pulses are injected in the upstream direction along the optical transmission fiber 26 entering optical amplifier module 10B. The pulses are of relatively high power (i.e., mW levels) and create distributed Raman amplification of the propagating optical signal along a span of input optical transmission fiber prior to entering optical amplifier module 10B.

Figure 17:
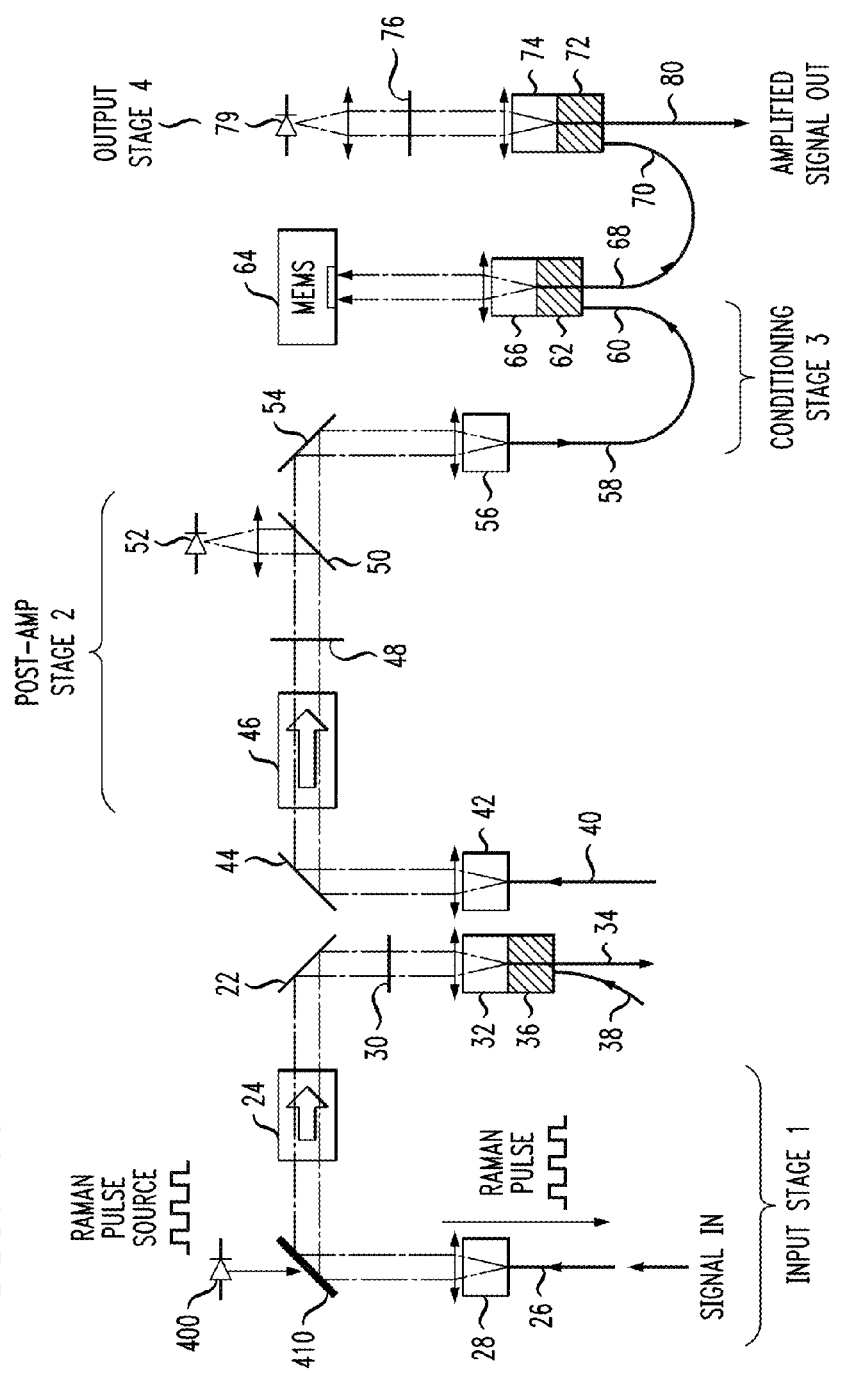
FIG. 17 illustrates an exemplary optical amplifier configuration based upon the diagram of FIG. 16, utilizing discrete optical components and free-space signal paths in accordance with the present invention.

FIG. 17 is a diagram of the discrete optical components and free-space signal paths for the exemplary module 10B of FIG. 16. As shown, a discrete laser diode 400 is included within input stage 1 as the amplifying light source and used to inject the Raman pulses "upstream" into input optical fiber 26. In order for the Raman pulses to be injected into the incoming signal path, a WDM 410 is used to ensure that the pulses are directed in the proper direction, while also re-directing the incoming free-space optical signal toward optical isolator 24. In particular, the turning mirror of the previous embodiments may be replaced by WDM 410 that is oriented in the manner shown in FIG. 17 to direct the various signals in the proper directions. The free-space propagating Raman pulses are shown impinging a WDM 410, which directs the pulses into optical fiber 26 so that the pulses will interact with the input optical signal along optical fiber 26 and provide amplification to the signal prior to entering the module itself.

The amplified input signal is re-directed by WDM 410 to pass through optical isolator 24, continuing its progression as a free-space beam through the various discrete optical elements (and, perhaps, an included section of erbium-doped fiber) in the same manner as described above. Also as discussed above, the angular positioning of WDM 410 and turning mirror 22 may be adjusted to compensate for beam displacement and pointing error problems (the adjustment being provided during assembly of the amplifier module, with the components then "fixed" in place—using an epoxy, for example—once the insertion loss at output fiber 34 is minimized).

Figure 18:
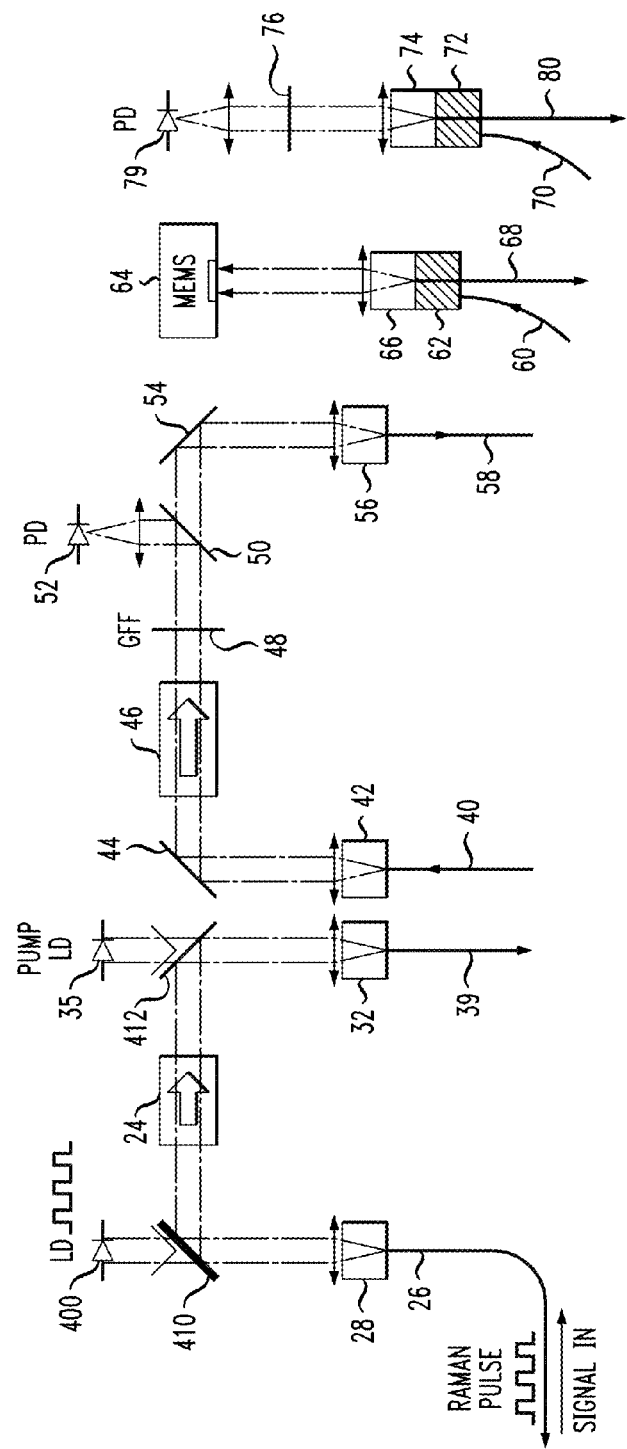
FIG. 18 is an alternative embodiment of the configuration of FIG. 17, where in this case both the Raman pulse source and the doped fiber pump source are integrated within the input stage and provide free-space signals used for amplification.

FIG. 18 is a diagram of yet another embodiment of the present invention, in this case providing both types of amplification (EDFA and DRA) from discrete laser diode sources that are included within the input stage of optical amplifier module 10. In particular, the input stage is shown as including both laser diode 35 (used to provide pump light to amplifier arrangement 11) and Raman laser diode source 400 (used to create distributed Raman amplification along input transmission fiber 26). This compact, modular free-space optics arrangement as shown in FIG. 18 is thus capable of providing both Raman amplification (along incoming fiber span), as well as gain within the doped fiber amplifier. While shown as including discrete pump sources disposed within the input stage, it is to be understood that in other configurations it is possible to utilize external pump sources, with optical fibers used to introduce the pump lights into the proper signal paths.

Figure 19:
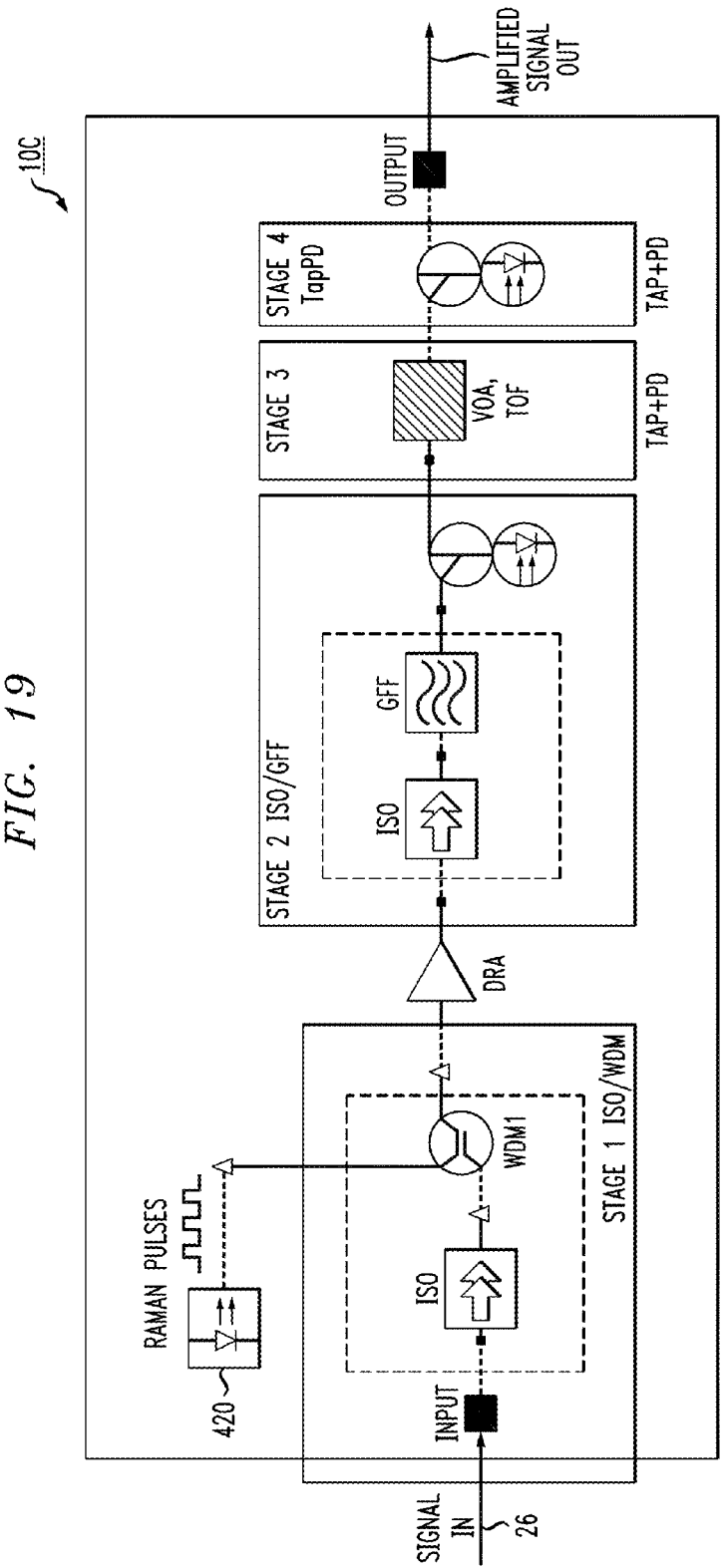
FIG. 19 is a block diagram of an alternative DRA arrangement, in this case using a section of single mode optical fiber to create Raman amplification of the incoming optical signal.

FIG. 19 is a block diagram illustrating another embodiment of the present invention, shown as optical amplifier module 10C. In this configuration, the doped fiber of the EDFA embodiments discussed above is replaced with a long length of conventional single mode fiber, identified as a "distributed Raman amplifier" (DRA) in the block diagram. In this arrangement, Raman pulse source 400 is used as the second input to the input stage (replacing the 980 nm pump light source). The incoming optical signal and Raman pulses therefore co-propagate within the coil of conventional single mode along which Raman amplification will take place.

Figure 20:
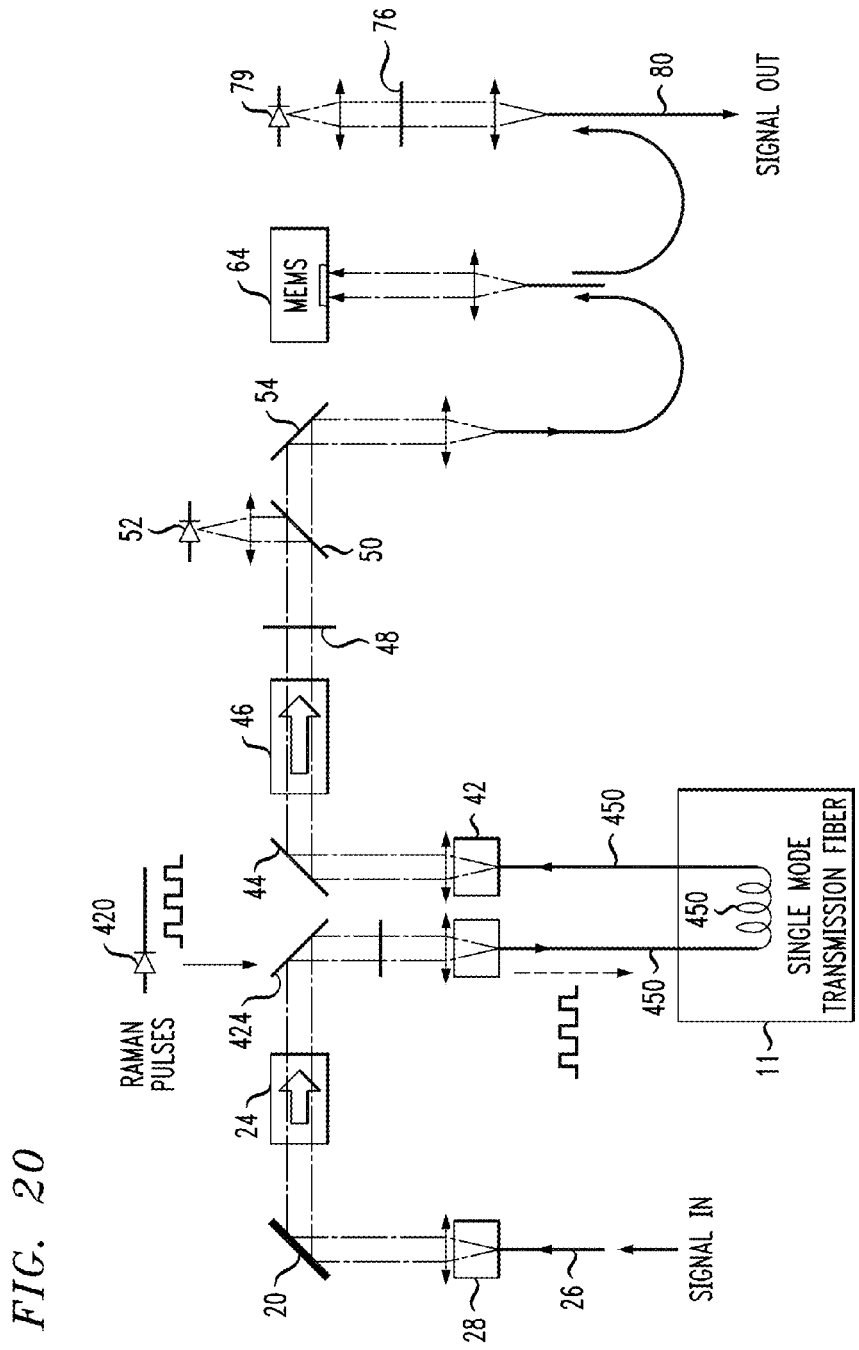
FIG. 20 illustrates an exemplary optical amplifier configuration based on the block diagram of FIG. 19, utilizing discrete optical components and free-space signal paths in accordance with the teachings of the present invention.

FIG. 20 is a diagram of the discrete optical components and free-space signal paths for optical amplifier module 10C as shown in FIG. 19. In this particular configuration, a discrete laser diode 420 is included within module 10D and used to create the necessary Raman pulses. As shown, the output pulses from laser diode 420 pass through a WDM 424 so as to be co-propagating with the incoming optical signal that passes through optical isolator 24 and is re-directed by WDM 424 in the manner shown in the diagram. The co-propagating pulses and input signals are subsequently coupled into an extended length of single mode fiber 450 housed within amplifier arrangement 11.

The remaining components of Stages 3 and 4 may be similar to those described above, including signal "conditioning" including functions such as attenuation, filtering and the like. Indeed, it is also to be remembered that there may be embodiments where the inclusion of a VOA and/or TOF is not necessary. The modular arrangement of the present invention allows this stage to be bypassed when not required, or eliminated from the initial assembly.

Figure 21:
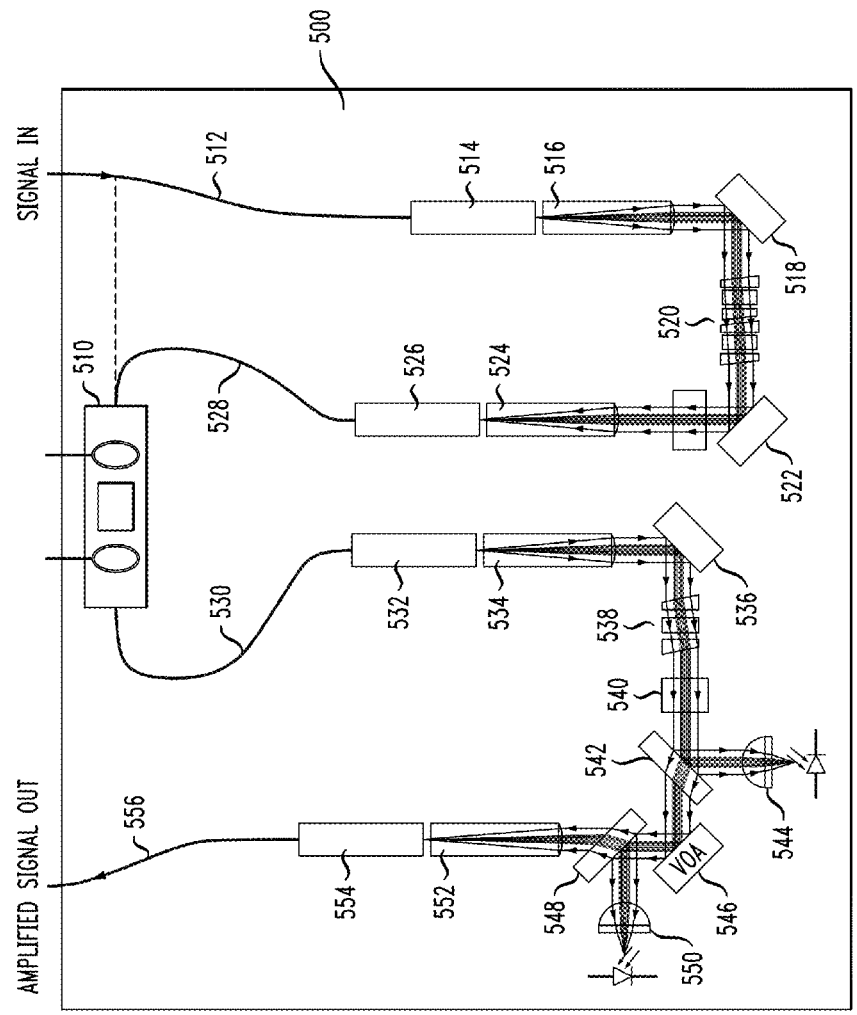
FIG. 21 illustrates an exemplary semiconductor optical amplifier formed using discrete optical components and free-space signal paths in accordance with the present invention.

While the above-described embodiments are all associated with fiber-based amplifiers, it is to be understood that the utilization of free-space optics is also compatible with the formation of semiconductor optical amplifiers (SOAs) that are likewise able to be packaged within the relatively compact small form factor configurations. FIG. 21 illustrates an exemplary SOA arrangement 500 that utilizes free-space signal paths and discrete optical components in accordance with the present invention.

Referring to FIG. 21, SOA arrangement 500 is shown as comprising a discrete semiconductor optical amplifier 510, of a form well-known in the art, that utilizes an electrical bias input (as shown) to provide amplification to an optical signal passing through the device. In accordance with the free-space implementation of the present invention, and similar to the embodiments described above, arrangement 500 includes an input stage and a post-amp stage. As shown, an optical signal enters arrangement 500 on an input optical fiber 512, which is coupled to an optical fiber pigtail 514. The free-space optical signal exiting fiber pigtail 514 (which is expanding in nature) is thereafter passed through a lens 516 to create a collimated version of the input signal (as in the embodiments described above). The collimated, free-space optical beam is then re-directed by a first turning mirror 518 to pass through an optical isolator 520. The output from optical isolator 520 is then re-directed by a second turning mirror 522 to pass through a lens 524, which functions to focus the free-space optical beam into the center of an output fiber pigtail 526, which provides the isolated optical input signal to a transmission fiber 528 that provides the signal as an input to SOA 510.

Subsequent to being amplified within SOA 510, the amplified optical signal is provided along an output transmission fiber 530 to be introduced into the free-space post-amplifier stage of arrangement 500. Similar to the various embodiments described above, the amplified signal is introduced via a fiber pigtail 532 to the free-space portion of the post-amplifier stage, where the free-space amplified signal is collimated as it passes through a lens 534. The collimated, amplified free-space beam is directed by a turning mirror 536 into an optical isolator 538, with the isolated beam then passing through a gain flattening filter (GFF) 540. As above, GFF 540 adjusts the gain profile of the amplified signal to achieve the desired output gain profile (which may be, in most cases, a "flat" gain across the bandwidth of the amplified signal). An optical tap 542 is used to direct a portion of the gain-flattened, free-space beam into a monitoring photodiode 544 (used to control the position and performance of GFF 540).

A majority of the free-space amplified beam passes unimpeded through optical tap 542 and is introduced to a variable optical attenuator (VOA) 546 that may be used to adjust the power level of the output signal. An optical tap 548 and associated monitoring photodiode 550 are used to adjust the operation of VOA 546 and control the output power from arrangement 500. The power-adjusted amplified signal (still propagating as a free-space beam) then passes through a focusing lens 552 and is introduced to a fiber pigtail 554 which couples the amplified output signal into an output transmission fiber 556.

The arrangement as shown in FIG. 21 thus allows for a similar configuration of optical components and free-space signal paths to (and, therefore, the same packaging arrangement) to be used with a SOA, merely by eliminating the pump source and coil of doped fiber—and inserting the SOA in place of the doped fiber. It is to be understood that as an alternative to using a similar set of components, an in-line isolator may be disposed directly along input transmission fiber 512, so that the isolated signal may be directly introduced into SOA 510 (as shown by the dotted line in FIG. 21).

As mentioned above, an aspect of various embodiments of the present invention is the use of discrete optical components and free-space signal paths to reduce the number of fibers (and, therefore, splices) within the amplifier module, as well as reduce the overall size of the module. Additionally, the various configurations that also utilize direct coupling of pump sources (both for doped fiber and Raman amplification) further reduce the number of fibers and related coupling elements.

Thus, to achieve the low loss, low PDL, and stability to processing and environmental changes, a unique set of design, material, assembly processes and conditions must be met. While variations of these choices are possible, all choices can have a significant effect on the outcome. Thus, the free-space, miniaturized modules of the present invention require a thorough consideration of the above-described physical effects and an appropriate design and process to achieve a product that meets customer requirements and performance specifications of demanding optical amplifier applications.

The multi-stage optical amplifier as described above is considered to be a significant advance over prior art configurations that utilize fiber-based connectors between various amplifier components (discrete, hybrid, or otherwise), creating an extremely small stand-alone arrangement useful as a pluggable form factor element. While various alternatives and embodiments have been described in detail above, it is to be understood that the various individual elements within each stage of the amplifier may vary, and in its most general configuration the amplifier requires only an input stage and an output stage. Elements such as bandpass filters (e.g., FBGs), gain-flattening filters, tunable filters, variable optical attenuators, optical taps and monitoring photodiodes, etc., are useful in enhancing the features of the amplifier, but not essential to the actual amplification function.

Indeed, it should be recognized that a number of variations of the above-identified embodiments will be obvious to one of ordinary skill in the art in view of the foregoing description. Accordingly, the inventive is not to be limited by those specific embodiments and methods of the present invention shown and described herein. Rather, the scope of the invention is to be defined by the following claims and their equivalents.

What is claimed is:

1. An optical amplifier for providing fiber-based amplification of an optical signal propagating along an incoming optical transmission signal path, the optical amplifier comprising
   a fiber amplifier arrangement; and
   a multi-stage optical amplifier module coupled to the fiber amplifier arrangement, the multi-stage optical amplifier module including
      an input stage responsive to an incoming optical signal and an amplifying light input; and
      an output stage for providing an amplified signal as the optical amplifier output,
      wherein the multi-stage optical amplifier is disposed within a housing including optical inputs, optical outputs, electrical inputs and electrical outputs, with each stage supporting the transmission of the incoming optical signal, amplifying light, and amplified optical signal as free-space beams and including a plurality of discrete optical components to interact with the free-space beams and provide the amplified optical output signal, the plurality of discrete optical components including a plurality of turning mirrors for providing the optical inputs and optical outputs along a common sidewall of the housing.

2. The optical amplifier of claim 1 wherein
   the input stage of the multi-stage amplifier module is responsive to the input optical signal and the amplifying light input, the optical signal and the amplifying light input propagating as free-space beams within the input stage and manipulated by a plurality of discrete optical components disposed within the input stage to be combined to co-propagate along a common signal path exiting the housing along the common sidewall and thereafter applied as an input to the fiber amplifier arrangement.

3. The optical amplifier of claim 1 wherein the optical amplifier further comprises
   a post-amplifier stage disposed between the input stage and the output stage of the multi-stage amplifier module, the post-amplifier stage responsive to the free-space beam amplified optical signal created by fiber amplifier arrangement, the post-amplifier stage including a discrete optical filter component disposed to perform filtering on the free-space beam amplified optical signal; and
   the output stage of the multi-stage amplifier module is responsive to a filtered, amplified optical output signal from the post-amplifier stage and supports the propagation of a free-space beam representation of the filtered, amplified optical output signal, the output stage including a plurality of discrete optical components include an optical tap and a monitoring photodiode, the propagating filtered, amplified free-space beam directed through the optical tap to direct a relatively small portion of the free-space beam into the monitoring photodiode and direct the remainder of free-space beam along the output signal path exiting the housing along the common sidewall.

4. The optical amplifier module as defined in claim 2 wherein the discrete optical components of the input stage of the multi-stage optical amplifier module comprise
   a first optical lens disposed at an entrance port along the common sidewall of the housing, the first optical lens responsive to the incoming optical signal and creating a collimated free-space beam version thereof;
   a first turning mirror for intercepting the collimated free-space beam from the first optical lens and re-directing the collimated free-space beam in a different direction;
   an optical isolator disposed to intercept the re-directed free-space beam;
   a second turning mirror for intercepting the re-directed free-space beam and re-orienting the collimated free-space beam in a direction toward the optical output along the housing common sidewall; and
   a second optical lens disposed between an exit port of the input stage along the common sidewall and the second turning mirror for focusing the collimated free-space beam into output signal path, wherein the angular positioning of the first and second turning mirrors are adjustable to minimize insertion loss between the input and the output of the input stage.

5. The optical amplifier as defined in claim 4 wherein the discrete optical components of the input stage of the multi-stage optical amplifier module further comprise:
   a dual-path fiber pigtail coupled to the common sidewall and including a first path for supporting the propagation of incoming pump light and a second path for supporting the propagation of out-going co-propagating input optical signal and amplifying light, directing the co-propagating input optical signal and amplifying light into the fiber amplifier arrangement; and
   a discrete wavelength division multiplexer element disposed between the second turning mirror and the second optical lens, the discrete wavelength division multiplexer element receiving the incoming free-space amplifying light and reflecting the free-space amplifying light into the second optical lens, the amplifying light thereafter coupled into the second path with the incoming optical signal.

6. The optical amplifier as defined in claim 4 wherein the input stage of the multi-stage optical amplifier module further comprises a discrete laser diode pump source, the discrete laser diode including electrical contacts coupled to an electrical input and an electrical output of the housing and positioned within the input stage to direct a free-space amplifying light beam through the second turning mirror and into the second optical lens, combining with the free-space input optical signal beam to create the co-propagating beams as the optical output of the input stage exiting along the common sidewall.

7. The optical amplifier as defined in claim 1 wherein the optical amplifier is based upon amplification in a fiber including a rare earth dopant and uses a pump source as the amplifying light, providing pump light at a predetermined wavelength associated with creating optical gain in the presence of the rare earth dopant.

8. The optical amplifier as defined in claim 1 wherein the optical amplifier comprises a distributed Raman amplifier, and the includes an amplifying light source in the form of a high power pulse source for injecting high-energy optical pulses into the fiber amplifier in combination with the incoming optical signal.

9. The optical amplifier as defined in claim 8 wherein the optical amplifier comprises a distributed Raman amplifier, disposed to inject high-energy optical pulses into a section of optical fiber within the fiber amplifier arrangement.

10. The optical amplifier as defined in claim 3 wherein the discrete optical components disposed within the post-amplifier stage of the multi-stage optical amplifier module include
    a first optical lens disposed at an optical input along the common housing sidewall, the first optical lens responsive to an incoming amplified optical signal from the fiber amplifier arrangement and creating a free-space beam version thereof;
    a first turning mirror disposed to intercept the collimated, amplified free-space beam from the first optical lens and re-direct the collimated, amplified free-space beam in a different direction;
    an optical isolator disposed to intercept the re-directed free-space beam; and
    a gain filter disposed at the output of the optical isolator, the gain filter comprising a thin film discrete filter element for modifying a gain profile of the collimated, amplified free-space beam.

11. The optical amplifier as defined in claim 10 wherein the gain filter comprises a gain flattening filter, creating a uniform gain profile across the wavelength spectrum of the collimated, amplified beam.

12. The optical amplifier as defined in claim 10, wherein discrete optical components of the post-amplifier stage of the multi-stage optical amplifier module includes an optical tap and a monitoring photodiode, the optical tap receiving as an input the gain-modified free-space beam output from the gain filter and re-directing a portion of the gain-modified free-space beam into the monitoring photodiode, the re-directed portion used by the monitoring photodiode for adjusting the orientation of gain filter to achieve the desired gain profile.

13. The optical amplifier as defined in claim 1 wherein the multi-stage optical amplifier module further comprises
    a signal conditioning stage disposed between the input stage and the output stage, the signal conditioning stage supporting the transmission of free-space beams and including discrete optical components for modifying at least one optical quality of the output amplified optical signal.

14. The optical amplifier as defined in claim 13 wherein the signal conditioning stage is configured to provide adjustments to the power level of the output amplified optical signal.

15. The optical amplifier as defined in claim 13, wherein the discrete optical components of the signal conditioning stage include a variable optical attenuator, the variable optical attenuator for adjusting an output power as a function of wavelength in the output amplified optical signal.

16. The optical amplifier as defined in claim 15 wherein the variable optical attenuator comprises an adjustable MEMS mirror.

17. The optical amplifier as defined in claim 13 wherein the signal conditioning stage is configured to provide noise filtering of the output amplified optical signal.

18. The optical amplifier as defined in claim 17 wherein the discrete optical components of the signal conditioning stage include a tunable optical filter.

19. The optical amplifier as defined in claim 1 wherein the fiber amplifier arrangement includes a section of rare earth doped optical fiber, coupled at the common sidewall between an optical output of the input stage and an optical input of the output stage.

20. The optical amplifier as defined in claim 19 where the rare earth doped optical fiber comprises erbium doped fiber and the input stage is receptive to a pump source operating at a wavelength of 980 nm.

21. The optical amplifier as defined in claim 20 wherein a discrete laser diode operating at a pump wavelength is disposed within the housing as a discrete optical component of the input of the multi-stage optical amplifier module.

22. The optical amplifier module as defined in claim 1 wherein the fiber amplifier arrangement includes both a doped fiber amplifier and a distributed Raman amplifier.

23. The optical amplifier module as defined in claim 1 wherein the fiber amplifier arrangement multi-stage optical amplifier module are sized to comply with CFP2 requirements.

24. The optical amplifier as defined in claim 23 wherein the plurality of stages forming the multi-stage optical amplifier module are disposed in sequence within the housing.

25. The optical amplifier as defined in claim 1 wherein the fiber amplifier arrangement and the multi-stage optical amplifier module are sized to comply with CFP4 requirements.

26. The optical amplifier as defined in claim 25 wherein a combination of the post-amplifier stage and the output stage are configured to partially surround the input stage to create a compact, nested multi-stage optical amplifier module for complying with CFP4 requirements.

27. A multi-stage optical amplifier module comprising
an input stage responsive to an incoming optical signal and an amplifying light signal along an input at a common housing sidewall, the input stage including first and second turning mirrors for re-directing the incoming signal to exit at an output along the common housing sidewall, wherein the angular positioning of the first and second turning mirrors is adjustable to minimize insertion loss between the input and the output of the input stage;
an amplifying arrangement coupled to the input stage at the common sidewall for generating an amplified version of the incoming optical signal; and
an output stage coupled to the output of the amplifying arrangement along the common sidewall, the output stage for providing an amplified signal as the multi-stage optical amplifier output, the multi-stage optical amplifier disposed within a housing including optical inputs, optical outputs, electrical inputs and electrical outputs, with each stage supporting the transmission of the incoming optical signal and amplified optical signal as free-space beams and including a plurality of discrete optical components to interact with the free-space beams and provide the amplified optical output signal.

28. The multi-stage optical amplifier as defined in claim 27 wherein the amplifying arrangement comprises a fiber-based amplifying arrangement.

29. The multi-stage optical amplifier as defined in claim 28 wherein the fiber-based amplifying arrangement includes a pump light source and a length of rare earth-doped optical fiber.

30. The multi-stage optical amplifier as defined in claim 28 wherein the fiber-based amplifying arrangement includes a high-power pulse source and a length of optical transmission fiber.

31. The multi-stage optical amplifier as defined in claim 27 wherein the amplifying arrangement comprises a semiconductor optical amplifier.

* * * * *